(12) United States Patent
Feldkamp

(10) Patent No.: US 11,416,308 B2
(45) Date of Patent: Aug. 16, 2022

(54) DISTRIBUTED LOAD BALANCING FOR PROCESSING OF HIGH-VOLUME DATA STREAMS

(71) Applicant: AT&T Intellectual Property I, L.P., Atlanta, GA (US)

(72) Inventor: Gregory E. Feldkamp, Southlake, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 32 days.

(21) Appl. No.: 17/106,615

(22) Filed: Nov. 30, 2020

(65) Prior Publication Data

US 2021/0081255 A1 Mar. 18, 2021

Related U.S. Application Data

(63) Continuation of application No. 16/224,314, filed on Dec. 18, 2018, now Pat. No. 10,901,805.

(51) Int. Cl.
*G06F 9/50* (2006.01)

(52) U.S. Cl.
CPC .......... *G06F 9/5083* (2013.01); *G06F 9/5072* (2013.01); *G06F 9/5077* (2013.01);
(Continued)

(58) Field of Classification Search
CPC .... G06F 9/5083; G06F 9/5072; G06F 9/5077; G06F 2209/5011; G06F 2209/5018
See application file for complete search history.

(56) References Cited

U.S. PATENT DOCUMENTS 7,139,242 B2 11/2006 Bays
7,343,413 B2 3/2008 Gilde et al.
(Continued)

FOREIGN PATENT DOCUMENTS

CN 102404229 4/2012
CN 103188345 7/2013
CN 104579996 4/2015

OTHER PUBLICATIONS

Handigol et al., "Plug-n-Serve: Load-Balancing Web Traffic using OpenFlow," ACM SIGCOMM Demo 4.5, Aug. 17-21, 2009.
(Continued)

*Primary Examiner* — Sisley N Kim
(74) *Attorney, Agent, or Firm* — Hartman & Citrin LLC

(57) ABSTRACT

Concepts and technologies directed to distributed load balancing for processing of high-volume data streams in datacenters are disclosed herein. In various aspects, a system can include a processor and memory storing instructions that, upon execution, cause performance of operations. The operations can include receiving raw data items in an incoming queue, and generating, within each of a plurality of worker processing threads, a load hash set that includes a load hash value for each of the raw data items in the incoming queue. The operations can include determining, within each worker processing thread, which of the raw data items to process from the incoming queue based on the load hash set, and processing, via one of the plurality of worker processing threads, each of the raw data items in the incoming queue based on the load hash value for each of the raw data items.

20 Claims, 10 Drawing Sheets

(52) U.S. Cl.
CPC .............. *G06F 2209/5011* (2013.01); *G06F 2209/5018* (2013.01)

(56) References Cited

U.S. PATENT DOCUMENTS

| | | | |
|---|---|---|---|
| 7,613,827 | B2 | 11/2009 | Bruck et al. |
| 7,986,629 | B1 | 7/2011 | Ferguson et al. |
| 8,248,928 | B1 | 8/2012 | Wang et al. |
| 8,886,796 | B2 | 11/2014 | Calder et al. |
| 9,178,823 | B2 | 11/2015 | Majumdar et al. |
| 9,253,098 | B2 | 2/2016 | Huici et al. |
| 9,338,226 | B2 | 5/2016 | Korangy et al. |
| 9,397,901 | B2 | 7/2016 | Majumdar et al. |
| 9,467,384 | B2 | 10/2016 | Zhang et al. |
| 9,547,521 | B2 | 1/2017 | Gleyzer |
| 9,781,041 | B2 | 10/2017 | Jain |
| 2008/0140826 | A1 | 6/2008 | McColgan et al. |
| 2011/0252477 | A1 | 10/2011 | Sridhar et al. |
| 2016/0140141 | A1* | 5/2016 | Darcy ............... G06F 16/137 707/827 |
| 2017/0011062 | A1* | 1/2017 | Zaveri ............... G06F 16/2379 |
| 2017/0012906 | A1 | 1/2017 | Szilagyi |
| 2017/0126789 | A1 | 5/2017 | Kondapalli et al. |
| 2017/0171050 | A1 | 6/2017 | Puzis et al. |
| 2017/0325120 | A1 | 11/2017 | Szilagyi et al. |
| 2017/0366605 | A1 | 12/2017 | Chang et al. |
| 2018/0026901 | A1 | 1/2018 | Sugunadass |
| 2018/0167325 | A1 | 6/2018 | Li et al. |
| 2018/0173799 | A1 | 6/2018 | McGarvey |

OTHER PUBLICATIONS

Jin et al., "Load Balancing In Distributed Workflow Management System," Proceedings of the 2001 ACM Symposium on Applied Computing, ACM 2001, Mar. 2001.

Kanodia, Vikram, "Multi-Class Latency Bounded Web Services," Thesis, Master of Science, Rice University, Apr. 2000.

Ousterhout et al., "Sparrow: Distributed, Low Latency Scheduling," Proceedings of the $24^{th}$ ACM Symposium on Operating Systems Principles (SOSP '13), Nov. 3-6, 2013.

AWS Documentation, "CRC32 Function—Amazon Redshift" Amazon Web Services, Inc., API Version Dec. 1, 2012, Accessed Dec. 9, 2018 at <https://docs.aws.amazon.com/redshift/latest/dg/crc32-function.html>.

U.S. Office Action dated May 8, 2020 in U.S. Appl. No. 16/224,314.

U.S. Notice of Allowance dated Sep. 23, 2020 in U.S. Appl. No. 16/224,314.

* cited by examiner

DISTRIBUTED LOAD BALANCING FOR PROCESSING OF HIGH-VOLUME DATA STREAMS

CROSS-REFERENCE TO RELATED APPLICATIONS

This application is a continuation of and claims priority to U.S. patent application Ser. No. 16/224,314, entitled "Distributed Load Balancing for Processing of High-Volume Data Streams," filed Dec. 18, 2018, now U.S. Pat. No. 10,901,805, which is incorporated herein by reference in its entirety.

BACKGROUND

In some datacenters, the physical host networking devices may be distributed across various locations. Through virtualized network architecture, the physical host networking devices can provide a virtual datacenter that appears cohesive to a user data plane. Telecommunication service providers can implement network virtualization platforms to share virtualized infrastructure that supports multiple communication services and network applications (including real-time and non-real-time applications). In some instances, a majority of network traffic in datacenters can occur internally, that is, between virtual machines and host devices that are included within the datacenter. Traditional systems for distributed computing environments may cause bottlenecks and single points of failure for processing data. Moreover, the prevalence of shifting processing to a datacenter has increased the volume of incoming data to a petabyte scale, which may cause computing systems to become burdened and operate inefficiently.

SUMMARY

The present disclosure is directed to distributed load balancing for processing of high-volume data streams without a front-end load balancer. According to one aspect of the concepts and technologies disclosed herein, a system is disclosed. In some embodiments, the system can include a processor and a memory. The memory can store computer-executable instructions that, when executed by the processor, cause the processor to perform operations. In some embodiments, the operations can include receiving raw data items in an incoming queue, where the incoming queue is in direct communication with each of a plurality of worker processing threads that form a worker pool. The operations can include generating, within each of the plurality of worker processing threads of the worker pool, a load hash set that includes a load hash value for each of the raw data items in the incoming queue. The operations can include determining, within each of the plurality of worker processing threads, which of the raw data items to process from the incoming queue based on the load hash set. The operations can further include processing, via one of the plurality of worker processing threads, each of the raw data items in the incoming queue based on the load hash value for each of the raw data items.

In some embodiments, the operations can further include inspecting the incoming queue, determining an incoming queue set size based on an amount of the raw data items that are present within the incoming queue, and determining an amount of worker processing threads that should operate in the worker pool so as to satisfy a target latency parameter for the worker pool. In some embodiments, the operations can further include reconfiguring the worker pool such that the target latency parameter is satisfied, where reconfiguring the worker pool includes one of spawning one or more worker processing threads to operate within the worker pool, or terminating one or more worker processing threads from the plurality of worker processing threads within the worker pool.

In some embodiments, the operations can further include generating a load hash range for the worker pool, separating the load hash range into a plurality of load hash subranges, and allotting one of the plurality of load hash subranges to each of the plurality of worker processing threads within the worker pool, where the allotting occurs without analysis of the raw data items within the incoming queue. In some embodiments, the load hash value provides a signed integer value, and the signed integer value falls within one of the plurality of load hash subranges that is allotted to one of the plurality of worker processing threads of the worker pool. In some embodiments, generating the load hash set includes determining the load hash value for each of the raw data items. In some embodiments, determining the load hash value for each of the raw data items includes: analyzing one or more fields within a raw data item, assembling a multivariate string that represents the raw data item based on the one or more fields, and creating a signed integer value that represents the load hash value based on transformation of the multivariate string.

According to another aspect of the concepts and technologies disclosed herein, a method is disclosed, according to an embodiment. The method can include receiving, by one or more processors of a system that provides a plurality of worker processing threads, raw data items in an incoming queue, where the incoming queue is in direct communication with each of the plurality of worker processing threads that form a worker pool. The method can include generating, within each of the plurality of worker processing threads of the worker pool, a load hash set that includes a load hash value for each of the raw data items in the incoming queue. The method can include determining, within each of the plurality of worker processing threads, which of the raw data items to process from the incoming queue based on the load hash set. The method can further include processing, via one of the plurality of worker processing threads, each of the raw data items in the incoming queue based on the load hash value for each of the raw data items.

In some embodiments, the method can further include inspecting, by one or more processors of the system, the incoming queue, determining, by one or more processors of the system, an incoming queue set size based on an amount of the raw data items that are present within the incoming queue, and determining, by one or more processors of the system, an amount of worker processing threads that should operate in the worker pool so as to satisfy a target latency parameter for the worker pool. In some embodiments, the method can further include reconfiguring, by one or more processors of the system, the worker pool such that the target latency parameter is satisfied, where reconfiguring the worker pool includes one of spawning one or more worker processing threads to operate within the worker pool, or terminating one or more worker processing threads from the plurality of worker processing threads within the worker pool.

In some embodiments, the method can further include generating, by one or more processors of the system, a load hash range for the worker pool, separating, by one or more processors of the system, the load hash range into a plurality of load hash subranges, and allotting, by one or more processors of the system, one of the plurality of load hash subranges to each of the plurality of worker processing threads within the worker pool, where the allotting occurs without analysis of the raw data items within the incoming queue. In some embodiments, the load hash value provides a signed integer value, and the signed integer value falls within one of the plurality of load hash subranges that is allotted to one of the plurality of worker processing threads of the worker pool. In some embodiments, generating the load hash set includes determining the load hash value for each of the raw data items. In some embodiments, determining the load hash value for each of the raw data items can include analyzing one or more fields within a raw data item, assembling a multivariate string that represents the raw data item based on the one or more fields, and creating a signed integer value that represents the load hash value based on transformation of the multivariate string.

According to yet another aspect, a computer storage medium is disclosed. The computer storage medium can have computer-executable instructions stored thereon. When the computer-executable instructions are executed by a processor, the processor can perform operations. In some embodiments, the processor can be included in a computer system of a datacenter. In some embodiments, the operations can include receiving raw data items in an incoming queue, where the incoming queue is in direct communication with each of a plurality of worker processing threads that form a worker pool. The operations can include generating, within each of the plurality of worker processing threads of the worker pool, a load hash set that includes a load hash value for each of the raw data items in the incoming queue. The operations can include determining, within each of the plurality of worker processing threads, which of the raw data items to process from the incoming queue based on the load hash set, and processing, via one of the plurality of worker processing threads, each of the raw data items in the incoming queue based on the load hash value for each of the raw data items.

In some embodiments, the operations can include inspecting the incoming queue, determining an incoming queue set size based on an amount of the raw data items that are present within the incoming queue, and determining an amount of worker processing threads that should operate in the worker pool so as to satisfy a target latency parameter for the worker pool. In some embodiments, the operations can further include reconfiguring the worker pool such that the target latency parameter is satisfied, where reconfiguring the worker pool includes one of spawning one or more worker processing threads to operate within the worker pool, or terminating one or more worker processing threads from the plurality of worker processing threads within the worker pool.

In some embodiments, the operations can further include generating a load hash range for the worker pool, separating the load hash range into a plurality of load hash subranges, and allotting one of the plurality of load hash subranges to each of the plurality of worker processing threads within the worker pool, where the allotting occurs without analysis of the raw data items within the incoming queue. In some embodiments, generating the load hash set includes determining the load hash value for each of the raw data items. In some embodiments, determining the load hash value for each of the raw data items can include: analyzing one or more fields within a raw data item, assembling a multivariate string that represents the raw data item based on the one or more fields, and creating a signed integer value that represents the load hash value based on transformation of the multivariate string.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
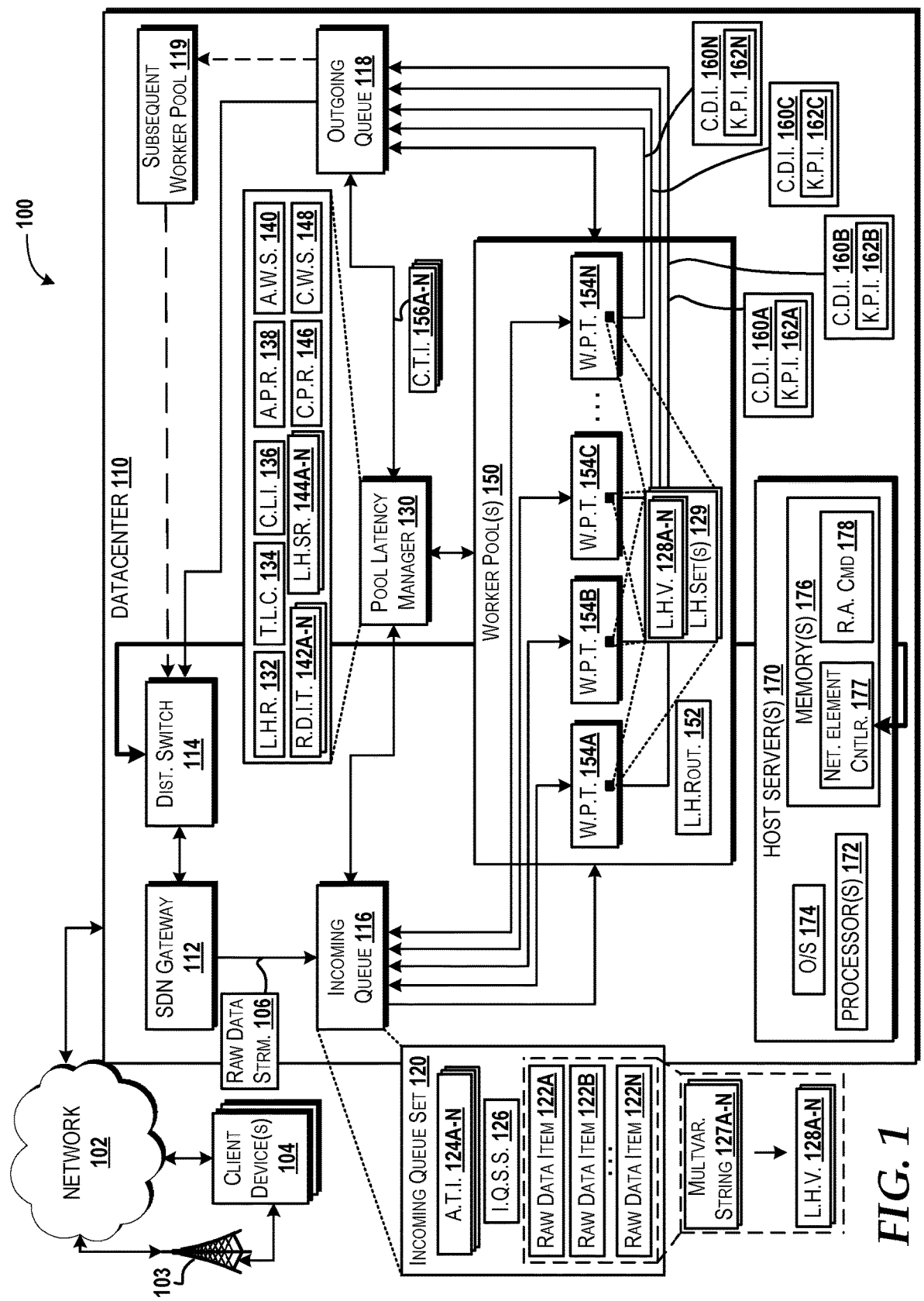
FIG. 1 is a block diagram illustrating an example operating environment in which aspects of distributed load balancing for processing high-volume data streams can be implemented, according to an illustrative embodiment.

The following detailed description is directed to distributed load balancing for processing high-volume data streams without a front-end load balancer in a datacenter. Traditional datacenters may include a front-end load balancer, process flow manager, or other centralized load distribution manager, that actively analyzes and distributes incoming work items for processing by reliance on a governing network policy. Some network governing policies may require significant administrative overhead during initial setup and frequently may need revision over time. Traditional network governing policies may not enable a datacenter to adapt to changes, and therefore the front-end load balancer may cause some portions of the datacenter to receive a much higher proportion of processing load than others. In turn, this may reduce processing efficiency and speed within the data center, and may require manual intervention by a network administration to modify the rules of the network governing policy to enable rebalancing. As the amount of incoming data to a datacenter increases, the likelihood of processing latency also increases when traditional approaches are employed. The effects of processing latency may be more readily observable when incoming data reaches a gigabyte, terabyte, or even petabyte scale. Moreover, a front-end load balancer may attempt to carry out some degree of processing every time a work item is received by the data center before the work item is assigned by the front-end load balancer to a portion of the datacenter for processing, thereby further contributing to the overall amount of processing latency. In addition to increasing processing latency, traditional approaches can reduce the efficiency of datacenter processing resources and memory resources, thereby increasing operating costs.

As such, concepts and technologies disclosed herein can provide distributing load balancing for processing high-volume data streams without a front-end load balancer. Embodiments of the present disclosure include a datacenter that provides a worker pool that shares in responsibility for processing data from an incoming queue. The worker pool can be a collection of two or more processing components, which in various embodiments is referred to as worker processing threads or "workers." In some embodiments, a worker processing thread can include a runtime instance of a microservice that may run and execute in a separate container (e.g., a Docker container) and/or may run as a separate process on hosts of the datacenter. In some embodiments, a worker processing thread may be configured as an execution node within a distributed processing architecture, such as an APACHE SPARK flow. Irrespective of the specific packaging, in various embodiments, each worker processing thread within a worker pool may be configured substantially similar to each other. In various embodiments, each worker processing thread may have an allocated amount of processing resources (e.g., virtual and/or non-virtual processing cores provided by one or more host servers) and/or memory resources (e.g., virtual and/or non-virtual memory provided by one or more host server). In some embodiments, one or more worker processing threads may be supported or otherwise provided in a virtualized data center. It is understood that the examples provided are for illustration purposes only, and therefore should not be construed as limiting in any way.

One aspect of the present disclosure provides reusable, interoperable data transformation and analytics microservices to enable quick design and implementation of processing flows via establishment of worker pools. Because high incoming data volumes may occur in a non-uniform manner, embodiments of the present disclosure can provide establishment and reconfiguration of worker pools that dynamically accommodate fluctuation in data volume, thereby providing flexible, low-complexity load balancing functionality without reliance on a front-end load balancer component to distribute all incoming data. As such, embodiments of the present disclosure can reduce administrative overhead, and enable autonomous sizing of worker pools so as to maintain conformance with target latency parameters in the event of sudden surges or variations in incoming data. A plurality of worker processing threads can operate and execute concurrently in the same worker pool, and multiple worker pools may operate concurrently with each other within the same datacenter. Each of the worker pools may share underlying compute resources, such as via virtualization provided by one or more host servers. In various embodiments, each worker pool can dynamically adjust in size based on time-varying loads of incoming data, thereby allowing for more efficient utilization of the underlying shared resources (e.g., compute, memory, storage, etc.). In various embodiments, the lack of a single front-end load balancing component can reduce the potential of a data bottleneck from occurring within the datacenter, thereby increasing the maximum rate at which incoming data can be processed and handled. These and other aspects of the concepts and technologies disclosed herein will be illustrated and described in more detail below.

While some of the subject matter described herein may occasionally be presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types in response to execution on a processor so as to transform the processor into a particular machine. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and other particularized, non-generic machines.

Referring now to FIG. 1, aspects of an operating environment 100 for implementing various embodiments of the concepts and technologies disclosed herein for distributed load balancing for processing high-volume data streams will be described, according to an illustrative embodiment. The operating environment 100 shown in FIG. 1 includes a communications network ("network") 102 that is communicatively coupled to a network access point 103, one or more instances of a client device 104, and a datacenter 110. It should be understood that the network 102 can include almost any type of computer networks as well as communications networks. The network 102 can be hosted, in part or in whole, by a communications service provider. The network 102 can include one or more of a radio access network, an evolved packet core network, a core network, an IP-based network, a transport network, an optical transport network, a circuit switched network, a mobile Wide Area Network, a combination thereof, or the like. In some embodiments, the datacenter 110 can be associated with at least a portion of the network 102, such as the portion which is operated by the communications service provider. The network 102 can host and/or be in communication with the datacenter 110 that can host one or more instances of virtualized and/or non-virtualized network services. For example, in some embodiments, the datacenter 110 can provide communication services, compute services, storage services, routing services, switching services, relay services, and/or other virtualized or non-virtualized network service. It should be understood that the term "service" should be construed as one or more executing applications that can provide a set of communication and/or network functions on behalf of the datacenter 110 and/or the network 102, and therefore the term "service" is not used, and should not be construed, to invoke any abstract idea or judicial exception. The network services can be used by a service provider, by third parties, and/or by customers via user equipment, servers, and/or other virtualized and/or non-virtualized computing systems. Further discussion of aspects that can be provided by the network 102 are provided with respect to FIG. 6. It should be understood that the examples provided are for illustration purposes only, and therefore should not be construed as limiting in any way.

In some embodiments, the operating environment 100 can include one or more instances of the client device 104. Instances of the client device 104 refers to any network device and/or user equipment sends and/or receives communications to the datacenter 110 via the network access point 103 and/or the network 102. Embodiments of the client device 104 can include, but should not be limited to, a user equipment, a mobile communications device, a server, a desktop computer, a laptop computer, a tablet, a customer premise equipment, a switch, or other computing systems that can send and/or receive communications with the datacenter 110. It is understood that zero, one, or more than one instances of the client device 104 can be present within various embodiments of the operating environment 100. Further discussion of aspects of an embodiment of the client device 104 is provided below with respect to FIG. 8.

In various embodiments, instances of the network access point 103 can provide communicative coupling between one or more devices (e.g., the client device 104) and the network 102. The network access point 103 can provide wired and/or wireless communicative coupling and can include, but should not be limited to, one or more of a base transceiver station, a wireless router, a femtocell, an eNodeB, a NodeB, a gNodeB (i.e., an access point that incorporates New Radio access technology, such as LTE Advanced and other 5G technology), a multi-standard metro cell node, a customer premise edge node (e.g., an optical network terminal), and/or other network nodes or combinations thereof that are capable of providing communication to and/or from the network 102. It should be understood that the examples provided are for illustration purposes only, and therefore should not be construed as limiting in any way.

In some embodiments, either of the client device 104 and/or the network access point 103 can generate and/or provide a raw data stream 106 to the datacenter 110 for processing and analysis. In some embodiments, the raw data stream 106 may be generated by a device within the network 102, although this may not necessarily be the case. The raw data stream 106 represents instances of data that provide a work load for the datacenter to process, analyze, and/or otherwise use as part of a network service to customers and/or to support functionality of the network 102. For example, in some embodiments, instances of the raw data stream 106 may be generated by activity from one or more of the client devices 104, where the client devices 104 are seeking to have the raw data stream 106 processed as part of a software-as-service provided by a communication service provider. As another example, instances of the raw data stream 106 may be provided by the network access point 103 as part of operation of a radio access network portion of the network 102, where the raw data stream 106 may enable a communication service provider to analyze network metrics and ensure proper operation of the network 102. It is understood that although one instance of the raw data stream 106 is illustrated in FIG. 1, other embodiments may include a plurality of raw data streams 106 originating from multiple sources. As such, the volume of data provided by instances of the raw data streams 106 may vary at any point in time. Additionally, the data size corresponding with instances of the raw data stream 106 may cumulatively amount to terabytes or even petabytes of data. In some embodiments, an instance of a raw data stream 106 can include one or more raw data items, such as any of raw data items 122A-N. A raw data item (e.g., any of the raw data items 122A-N) refers to instances of data that have yet to be processed into a completed data item. In some embodiments, a raw data item may be referred to as a "work item" because the instance of data can be processed and analyzed by the datacenter 110. In various embodiments, use of the term "raw" with respect to data (e.g., raw data item) is intended to refer to instances of data which have not yet been fully processed or otherwise transformed into a completed data item. Once an instance of a raw data item is processed, analyzed, or otherwise transformed by the datacenter 110, the resulting instance of data may be referred to as a completed data item, such as any of completed data items 160A-N. It is understood that, in some embodiments, the raw data items 122A-N of the raw data stream 106 may be processed by multiple components of the datacenter 110, according to the particular analysis being performed. It is understood that the examples provided are for illustration purposes only, and therefore should not be construed as limiting in any way.

In various embodiments, the datacenter 110 can include one or more computing systems that host, support, or otherwise facilitate operation of the datacenter 110, such as a software defined networking ("SDN") gateway 112, a distribution switch 114, and/or a host server 170. In some embodiments, the SDN gateway 112 can provide a communication interface through which instances of the raw data stream 106 can be provided to the datacenter 110 and/or to elements within the datacenter 110, such as an incoming queue 116 discussed below. In various embodiments, the distribution switch 114 can provide routing of data to elements within the datacenter 110 and/or outside of the datacenter 110, such as to the network 102, the client device 104, and/or the network access point 103. As such, the distribution switch 114 can include a device that receives data, such as from an outgoing queue 118, and redirects the data to a destination. In various embodiments, one or more instances of the host server 170 may be included within the datacenter 110. The host server 170 can provide physical hardware computing infrastructure that can be selected and/or activated from an available inventory of processing resources and memory resources, such as processors 172 and memory storage devices ("memory"), such as memory 176. In various embodiments, one or more instances of the host server 170 can provide virtual network functions and/or non-virtual (i.e., physical) network functions. In various embodiments, the datacenter 110 can include a plurality of instances of the host server 170 so as to provide a network virtualization platform, aspects of which are discussed below with respect FIG. 7, according to an embodiment.

In various embodiments, the processors 172 can include one or more processing units that are configured as hardware components that perform computations to process data, via computer-executable instructions from one or more application programs, routines, operating systems, and/or other software, to provide, at least in part, any of the operations or composition of functions described herein. For example, the processors 172 can include one or more central processing units ("CPUs") configured with one or more processing cores, one or more graphics processing unit ("GPU") configured to accelerate operations performed by one or more CPUs, and/or one or more systems on a chip ("SOC") to perform computations to process data, and/or to execute computer-executable instructions of one or more application programs, operating systems, and/or other software that may or may not include instructions particular to graphics and/or communications computations. Further discussion of embodiments of the processor 172 as a processing unit and/or compute resources can be found with respect to FIG. 7 and FIG. 8. In some embodiments, the processors 172 may support one or more aspects of a physical network topology and/or a virtual network topology, such as discussed in further detail with respect to FIG. 5. In various embodiments, the memory 176 can include one or more memory storage devices that include hardware components that perform storage operations, including temporary or permanent storage operations. In some embodiments, the memory 176 can include volatile and/or non-volatile memory implemented in any method or technology for storage of information such as computer-readable instructions, data structures, program modules, or other data disclosed herein. It is understood that, in the claims, use of the terms "memory," "computer storage medium," or variations thereof, does not include, and shall not be construed or interpreted to include, a wave or a signal per se and/or communication media.

In various embodiments, the host server 170 can support one or more instances of an operating system 174. In an embodiment, the operating system 174 illustrated in FIG. 1 corresponds with an operating system from the LINUX family of operating systems built around a LINUX kernel, however this may not be the case for every embodiment. In some embodiments, the operating system 174 can include, but is not limited to, one or more instances from members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like. It should be understood that the examples provided are for illustration purposes only, and therefore should not be construed as limiting in any way.

In various embodiments, the host server 170 can conform to various industry standards and protocols which are known to one of ordinary skill in the technology. Instances of the host server 170 can include one or more network interfaces (not shown) that can communicatively couple elements within the datacenter 110 to each other and/or to elements outside of the datacenter 110, such as but not limited to the network 102, the client device 104, and/or the network access point 103. In some embodiments, the host server 170 can include one or more server clusters that can (re)allocate and (re)distribute processing and/or memory resources amongst one or more physical and/or virtual machines within the datacenter 110. In various embodiments, the host server 170 and the operating system 174 may support or otherwise provide a hypervisor that provides virtualized functions, such as the instantiation, execution, and support of one or more virtual machines that can provide one or more virtual services for the datacenter 110. In some embodiments, one or more operations and functions discussed herein may be provided by a virtualized network function. Further discussion of an embodiment of the host server 170 can be found below with respect to FIG. 8. It is understood that the examples provided are for illustration purposes only, and therefore should not be construed as limiting in any way.

In various embodiments, the datacenter 110 can include the incoming queue 116. In some embodiments, a single instance of the incoming queue 116 exists for each worker pool, such as a worker pool 150. The worker pool 150 can include a plurality of worker processing threads, such as any of worker processing threads ("WPT") 154A-N, which will be discussed below in further detail. The incoming queue 116 can provide a temporary data container that stores the raw data items 122A-N in memory prior to each of the raw data items 122A-N being processed by the worker pool 150. An instance of the incoming queue 116 can provide a single incoming queue for an entire worker pool, such as the worker pool 150. As such, the incoming queue 116 can be in direct communication with each of the WPTs 154A-N that are included within the worker pool 150 such that there exists no intermediate and/or intervening load balancer between the incoming queue and an instance of a worker processing thread of the worker pool 150. By this, each of the WPTs 154A-N of the worker pool 150 can independently access, analyze, and/or obtain any and/or all of the raw data items 122A-N from the incoming queue 116 without seeking permission or authorization from a front-end load balancer component. In various embodiments, when the raw data items 122A-N are in the incoming queue 116, the raw data items 122A-N may collectively be referred to as an incoming queue set 120. The incoming queue set 120 can have an incoming queue set size 126, which refers to the total amount of raw data items 122A-N within the incoming queue 116 that are yet to be processed by the worker pool 150.

In various embodiments, the datacenter 110 can include an outgoing queue, such as the outgoing queue 118. In various embodiments, an instance of the worker pool 150 may correspond with a single incoming queue and a single outgoing queue, such as a single instance of the incoming queue 116 and a single instance of the outgoing queue 118. The outgoing queue 118 can receive instances of data that have been processed by the WPTs 154A-N of the worker pool 150, such as instances of completed data items 160A-N. In some embodiments, each of the WPTs 154A-N is in direct communication with the outgoing queue 118, thereby enabling each of the WPTs 154A-N to independently provide one or more of the completed data items 160A-N to the outgoing queue 118. In some various embodiments, the outgoing queue 118 is communicatively coupled to the distribution switch 114 and/or the memory 176. In some embodiments, the outgoing queue 118 can provide one or more of the completed data items 160A-N to a target destination via the distribution switch 114, such as to the network access point 103, the client device 104, another element within the datacenter 110, or the like. In some embodiments, the outgoing queue 118 may be in direct communication with a subsequent worker pool 119, where the outgoing queue 118 serves as an incoming queue for the subsequent worker pool 119. As such, the completed data items 160A-N may undergo further processing and/or analysis by the subsequent worker pool 119 using operations discussed herein. Further discussion of an embodiment in which multiple worker pools are employed is provided below with respect to FIG. 3. It should be understood that the examples provided are for illustration purposes only, and therefore should not be construed as limiting in any way.

In various embodiments, the completed data items 160A-N are created based on one of the WPTs 154A-N processing the raw data items 122A-N so as to transform, reconfigure, or otherwise generate new information that can be employed in the operation of the datacenter 110, the network 102, the client device 104, the network access point 103, or other network service or function. For example, in some embodiments, each of the completed data items 160A-N can include a key performance indicator, such as key performance indicators 162A-N, that correspond with the completed data items 160A-N, respectively. As used herein, a "key performance indicator" refers to an indicator of performance pertaining to a network service, network element, computing resource, or other metric that is confined to the realm of technology, and therefore, shall not be construed or interpreted as being directed to non-patent eligible subject matter. In some embodiments, one or more of the key performance indicators 162A-N can be used to adjust, reconfigure, or otherwise manage the operation of network elements. For example, in some embodiments, one or more completed data items 160A-N can be provided to a network element controller 177 that is stored in the memory 176. The network element controller 177 may be an application and/or network service that executes and operates so as to maintain network operation and network optimization. In some embodiments, the network element controller 177 may analyze one or more of the completed data items 160A-N generated by the WPTs 154A-N of the worker pool 150, and determine that one or more key performance indicators 162A-N correspond with the network access point 103. Based on one or more of the key performance indicators 162A-N, the network element controller 177 may determine that the network access point 103 experiences a decrease in wireless communication activity during a defined period of time (e.g., a time period on one or more days of the week), thereby indicating an excess amount of processing resources and/or energy resources (e.g., in the form of power being provided to one or more radio communication components and/or the amount of radio communication components that are active and powered on). In this example, the network element controller 177 may generate a resource adjustment command 178 based on one or more of the completed data items 160A-N, where the resource adjustment command 178 is provided to, and instructs, the network access point 103 to perform a reconfiguration operation, such as but not limited to, deactivation of radio communication components to reduce energy consumption, reduce transmission power level due to decrease in communication activity, or engage a stand-by mode for active processors. By this, the technical operation of network communication is improved through increased resource optimization and efficient processing utilization. It should be understood that the examples provided are for illustration purposes only, and therefore should not be construed as limiting in any way.

In various embodiments, the datacenter 110 can include a pool latency manager 130. The pool latency manager 130 can execute independent from the worker pool 150 and may be supported by the host server 170. The pool latency manager 130 can be configured to monitor processing latency between the input and output queues, such as the incoming queue 116 and the outgoing queue 118. The pool latency manager 130 can establish a worker pool through the spawning of WPT instances, such as one or more of the WPTs 154A-N. The pool latency manager 130 can adjust and/or reconfigure a worker pool through creation of additional WPTs or termination of WPTs so as to satisfy a target latency, which is discussed below in further detail with respect to FIG. 2. The pool latency manager 130 can provide worker pool optimization through assignment of load hash subranges, such as load hash subranges 144A-N, to WPTs 154A-N within the worker pool 150. In various embodiments, the pool latency manager 130 can inspect and analyze any queue that communicates with a worker pool, such as the incoming queue 116 and the outgoing queue 118 that directly communicate with the WPTs 154A-N of the worker pool 150. The pool latency manager 130 does not serve as an intermediary and/or load balancer for the WPTs 154A-N, but rather provides resource optimization through analysis of processing latency of the worker pool 150. For example, in various embodiments, when any one of the raw data items 122A-N arrives at the incoming queue 116, an arrival time indicator, such as any of the arrival time indicators 124A-N, can be created to indicate the time which the raw data item arrived at the incoming queue 116 and further indicate that the raw data item is awaiting processing. Similarly, when any one of the completed data items 160A-N reaches the outgoing queue 118, an instance of a completed time indicator, such as any of the completed time indicators 156A-N, can be created to indicate the time which the corresponding raw data item processing was completed by the corresponding one of WPTs 154A-N from the worker pool 150. Based on the arrival time indicators 124A-N and the completed time indicators 156A-N, a current processing latency time can be determined, such as indicated by an instance of a current latency indicator 136. In some embodiments, the difference between each of the completed time indicators 156A-N and the arrival time indicators 124A-N can yield an indication of the processing latency for a given WPT within a worker pool. The pool latency manager 130 can combine the processing latency for each of the WPTs 154A-N to determine the total processing latency for the worker pool 150, which is indicated by the current latency indicator 136. In various embodiments, the pool latency manager 130 can update and/or (re)generate the current latency indicator 136 on a (a)periodic basis. The current latency indicator 136 can be used by the pool latency manager 130 to determine whether adjustments and/or reconfiguration of the worker pool 150 are needed so as to optimize utilization of resources and/or satisfy a target latency for processing by the worker pool 150. Further discussion of processing latency and worker pool size management is provided below with respect to FIG. 2.

In various embodiments, the pool latency manager 130 can spawn one or more instances of a WPT to create a worker pool, such as any of the WPTs 154A-N for the worker pool 150. In an embodiment, a WPT can include a runtime instance of a microservice provided by the datacenter 110 that may run and execute in a separate container (e.g., a Docker container) and/or may run as a separate process on the host server 170. In another embodiment, a WPT may be configured as an execution node within a distributed processing architecture, such as within a virtual network topology discussed below with respect to FIG. 5. In some embodiments, the instances of WPTs within a worker pool (e.g., the WPTs 154A-N of the worker pool 150) can include multiple execute context instances on a corresponding processor core (e.g., via a virtual and/or non-virtual processor). In some embodiments, the WPTs of a worker pool may share the same virtual address space, executable code, and data files, while also being configured to access separate instructions, access separate portions of address space, and operate on separate portions of input (e.g., access different instances of the raw data items 122A-N from the incoming queue 116). As such, in some embodiments, each of the WPTs of a worker pool can correspond with a different program counter, stack pointer, stack, and stack specific registers such that each WPT has separate data structures to represent the per-thread information being processed and generated (e.g., separate data structures for the each of the raw data items 122A-N that are transformed or otherwise employed to generate the completed data items 160A-N).

In various embodiments, workload allocation (i.e., determination of processing of instances of the raw data items 122A-N by one of the WPTs 154A-N) can be provided by each of the WPTs of a worker pool, such as each of the WPTs 154A-N of the worker pool 150. In various embodiments, all of the WPTs from a worker pool (e.g., all of the WPTs 154A-N of the worker pool 150) can access, analyze, and retrieve work items from the same incoming queue, such as any of the raw data items 122A-N from the incoming queue 116. Each of the WPTs 154A-N independently analyzes, determines, and recognizes which work items (i.e., which of the raw data items 122A-N) should be processed by the WPT (i.e., the WPT performing the analysis) and which work items should be ignored (i.e., determine and recognize which of the instances of raw data items 122A-N that are to be processed by other WPTs in the worker pool and not by the WPT performing the analysis). The determination of workload allocation by each of the WPTs within a worker pool occurs without a front-end load balancer, processing manager, or any other central entity (within or outside the worker pool) examining the incoming raw data items 122A-N and making explicit assignments of the raw data items within the incoming queue 116 to a particular WPT. By this, embodiments of the present disclosure provide distributed load balancing without employing a front-end load balancer.

In various embodiments, the load balancing without a front-end load balancer can be provided by each of the WPTs 154A-N executing a load hash routine, such as the load hash routine 152, that is invoked to analyze incoming work items (e.g., the raw data items 122A-N) to the incoming queue 116 and serve as a basis for self-allocation of the raw data items 122A-N to the WPTs 154A-N of the worker pool 150. In some embodiments, the load hash routine 152 can include a hashing function that provides a transformation and/or mapping of a multivariate string into an integer value, such as a signed integer value. An example of the load hash routine 152 can include, but should not be limited to, a cyclic redundancy check 32 ("CRC32") function. In some embodiments, the load hash routine 152 may include invocation of a cryptographic function and/or another cyclic redundancy checksum. In various embodiments, each of the WPTs 154A-N of the worker pool 150 invokes and executes the same load hash routine 152. Invocation and execution of the load hash routine 152 can generate a load hash value, such as any of the load hash values 128A-N, based on input of information, such as an instance of a multivariate string 127A-N from a corresponding one of the raw data items 122A-N. To obtain or otherwise determine the multivariate string 127A-N that should be employed to generate an instance of a load hash value (e.g., one of the load hash values 128A-N), each of the WPTs 154A-N may determine a raw data item type that corresponds with a particular raw data item in the incoming queue 116, such as one of raw data item types 142A-N.

In various embodiments, the raw data items 122A-N may correspond with a raw data item type, such as one of the raw data item types 142A-N. For example, in some embodiments, a raw data item type can indicate that a raw data item corresponds with a message, a file, a record, a combination thereof, or the like. In some embodiments, when a raw data item type (e.g., the raw data item type 142A) indicates that of a message, then the corresponding raw data item may include a message that has a unique message identifier, which can be used as a multivariate string. In some embodiments, if a message has a message identifier that is not unique or is otherwise shared with other messages, then the raw data item may be identified through multiple fields, such as concatenation of a variable field (e.g., a user-input subject matter field) and/or an informational field (e.g., a timestamp of the message) so as to yield a multivariate string. In some embodiments, when a raw data item type (e.g., a raw data item type 142B that is one of the raw data item types 142A-N) corresponds with a file, then the corresponding raw data item may be identified through a file name, which can be provided as a multivariate string. In some embodiments, when a raw data item type (e.g., a raw data item type 142C that is one of the raw data item types 142A-N) corresponds with a record, then the corresponding raw data item may be identified through the use of two or more fields to yield a multivariate string. For example, two or more fields included within the record may be concatenated so as to create a multivariate string that can be used for identification. It is understood that, for any of the raw data item types 142A-N, the information that is used to identify the corresponding raw data item (e.g., any of the multivariate strings discussed above) may be used to provide a multivariate string (e.g., any of the multivariate strings 127A-N), which in turn can be transformed into a load hash value, such as any of the load hash values 128A-N.

In various embodiments, when an instance of a multivariate string (e.g., any of the multivariate strings 127A-N) is input to the load hash routine 152 (e.g., executing on each of the WPTs 154A-N), the resultant yields an instance of a load hash value, such as any of the load hash values 128A-N. As such, each of the raw data items 122A-N corresponds with a load hash value, such as one of the load hash values 128A-N. Each of the WPTs 154A-N invokes the load hash routine 152 to determine a load hash value for each of the raw data items 122A-N. The collection of all of the load hash values 128A-N for the raw data items 122A-N in the incoming queue 116 may be referred to as a load hash set 129. As such, each of the WPTs 154A-N can independently generate an instance of the load hash set 129 that includes the load hash values 128A-N which correspond with the raw data items 122A-N, respectively. In various embodiments, a load hash value can be a signed integer value that falls within a load hash range, such as a load hash range 132. In some embodiments, the load hash range 132 can span from a lower boundary (with a negative polarity) to an upper boundary (with a positive polarity). For example, in an embodiment the load hash range 132 can span from a lower boundary of $[-2^{32}]$ to an upper boundary of $[2^{32}-1]$, although this may not necessarily be the case for every embodiment. It should be understood that the examples provided are for illustration purposes only, and therefore should not be construed as limiting in any way.

In various embodiments, the pool latency manager 130 may create or otherwise establish an indication of the load hash range 132. The pool latency manager 130 can separate or otherwise divide the load hash range 132 into a plurality of load hash subranges, such as the load hash subranges 144A-N, based on the amount of WPTs 154A-N that are currently present and executing within the worker pool 150. In some embodiments, the load hash subranges 144A-N can correspond with any division of the load hash range 132 so as to create one or more segmented ranges that span the entirety of the load hash range 132. For example, when an instance of a WPT is spawned, the pool latency manager 130 can provide the WPT with one of the load hash subranges 144A-N. Each of the WPTs 154A-N can (a)periodically scan the incoming queue 116 and each of the WPTs 154A-N can independently generate a load hash value for each of the raw data items 122A-N in the incoming queue 116 (e.g., the load hash values 128A-N that are generated based on the multivariate strings 127A-N which correspond with the raw data items 122A-N, respectively). Instances of the raw data items 122A-N that have a load hash value (i.e., one of the load hash values 128A-N) that falls within an assigned load hash subrange for the corresponding WPT (e.g., within one of the load hash subranges 144A-N assigned to the WPT performing the processing) are obtained and processed by that WPT. Instances of the raw data items 122A-N that have a load hash value (i.e., one of the load hash values 128A-N) that falls outside of an assigned load hash subrange for a corresponding WPT (e.g., outside one of the load hash subranges 144A-N assigned to the WPT performing the processing) are ignored by that WPT instance. By this, the worker pool 150 can provide distributed load balancing such that each of the WPTs 154A-N will process instances of the raw data items 122A-N that have a corresponding load hash value that falls within their load hash subrange without reliance on a front-end load balancer. In various embodiments, each of the WPTs 154A-N can recognize that one or more of the raw data items 122A-N should be processed by them instead of being ignored based on comparison of the corresponding load hash value with the load hash subrange assigned or otherwise allotted to that WPT of the worker pool 150. In some embodiments, the pool latency manager 130 can monitor the amount of raw data items being processed by each of the WPTs 154A-N of the worker pool 150. If the pool latency manager 130 determines that one or more WPTs 154A-N are handling (i.e., processing raw data items and generating completed data items) in excess of a defined single instance processing threshold (e.g., a bottleneck threshold), then the pool latency manager 130 may reconfigure the worker pool 150 by spawning new, additional WPTs so as to increase capacity in the worker pool 150. The pool latency manager 130 can create new load hash subranges 144A-N based on the adjusted amount of WPTs of the worker pool 150 such that each of the WPTs 154A-N are processing raw data items from the incoming queue below the defined single instance processing threshold.

In various embodiments, the pool latency manager 130 may add or terminate an instance of a WPT from the worker pool 150, and when this occurs, the pool latency manager 130 may re-divide the load hash range 132 equally based on the adjusted amount of amount of WPTs in the worker pool 150, thereby redefining the amount of load hash subranges 144A-N and/or the load hash values that will fall within each of the load hash subranges 144A-N. Stated differently, any time the pool latency manager 130 adds or terminates a WPT from a worker pool, the pool latency manager 130 re-divides the load hash range 132 equally among the WPT population and provides each WPT with its currently assigned load hash subrange. In some embodiments, the current amount of WPTs 154A-N that are present and currently executing within the worker pool 150 may be indicated by a current worker size, such as the current worker size 148. In some embodiments, the pool latency manager 130 may determine that an adjustment or reconfiguration to the amount of WPTs operating in the worker pool 150 is warranted, which can be indicated by an adjusted worker size, such as the adjusted worker size 140. In various embodiments, when the load hash set 129 is generated, the load hash values 128A-N included there can be uniformly distributed across the load hash subranges 144A-N based on the transformation by the load hash routine 152. As such, each of the WPTs 154A-N can be assigned processing responsibility for a fraction of the load hash range 132 without the pool latency manager 130 analyzing the content (and/or the raw data item type) of the raw data items 122A-N. In various embodiments, the rate with which processing occurs by worker pool 150 (e.g., measured in number of raw data items processed per unit of time) may be indicated by a current processing rate, such as the current processing rate 146. In some embodiments, the pool latency manager 130 may create or otherwise define an upper processing latency threshold indicating a maximum amount of time that is allowable for processing latency, such as indicated by a target latency ceiling 134. In some embodiments, the pool latency manager 130 can determine whether the current processing rate 146 is sufficient to meet or otherwise satisfy the target processing latency as indicated by the target latency ceiling 134. If the worker pool 150 exceeds the target processing latency, such as indicated by being the current latency indicator 136 being greater than the target latency ceiling 134, then the pool latency manager 130 may create or otherwise define an adjusted processing rate, such as the adjusted processing rate 138, so as to satisfy the target processing latency. In various embodiments, the pool latency manager 130 may reconfigure or otherwise adjust the amount of WPTs operating within the worker pool 150 based on the adjusted processing rate 138 and/or the adjusted worker size 140. Further discussion is provided below with respect to FIG. 2. It is understood that the concepts and technologies discussed herein improve the functioning of particular computing systems by solving technical challenges that arise because of, and specifically within, the realm to network technology pertaining to datacenters. It is understood that the examples provided are for illustration purposes only, and therefore should not be construed as limiting in any way.

FIG. 1 illustrates instances of one of the network 102, the network access point 103, the client device 104, the raw data stream 106, the datacenter 110, the SDN gateway 112, the distribution switch 114, the incoming queue 116, the outgoing queue 118, the subsequent worker pool 119, the incoming queue set 120, the raw data items 122A-N, the arrival time indicators 124A-N, the incoming queue set size 126, the multivariate strings 127A-N, the load hash values 128A-N, the load hash set 129, the pool latency manager 130, the load hash range 132, the target latency ceiling 134, the current latency indicator 136, the adjusted processing rate 138, the adjusted worker size 140, the raw data item types 142A-N, the load hash subranges 144A-N, the current processing rate 146, the current worker size 148, the worker pool 150, the load hash routine 152, the WPTs 154A-N, the completed time indicators 156A-N, the completed data items 160A-N, the key performance indicators 162A-N, the host server 170, the processors 172, the operating system 174, the memory 176, the network element controller 177, and the resource adjustment command 178. It should be understood, however, that some implementations of the operating environment 100 can include zero, one, or more than one instances of these elements of the operating environment 100 shown in FIG. 1. As such, the illustrated embodiment of the operating environment 100 should be understood as being illustrative, and should not be construed as being limiting in any way.

Figure 2:
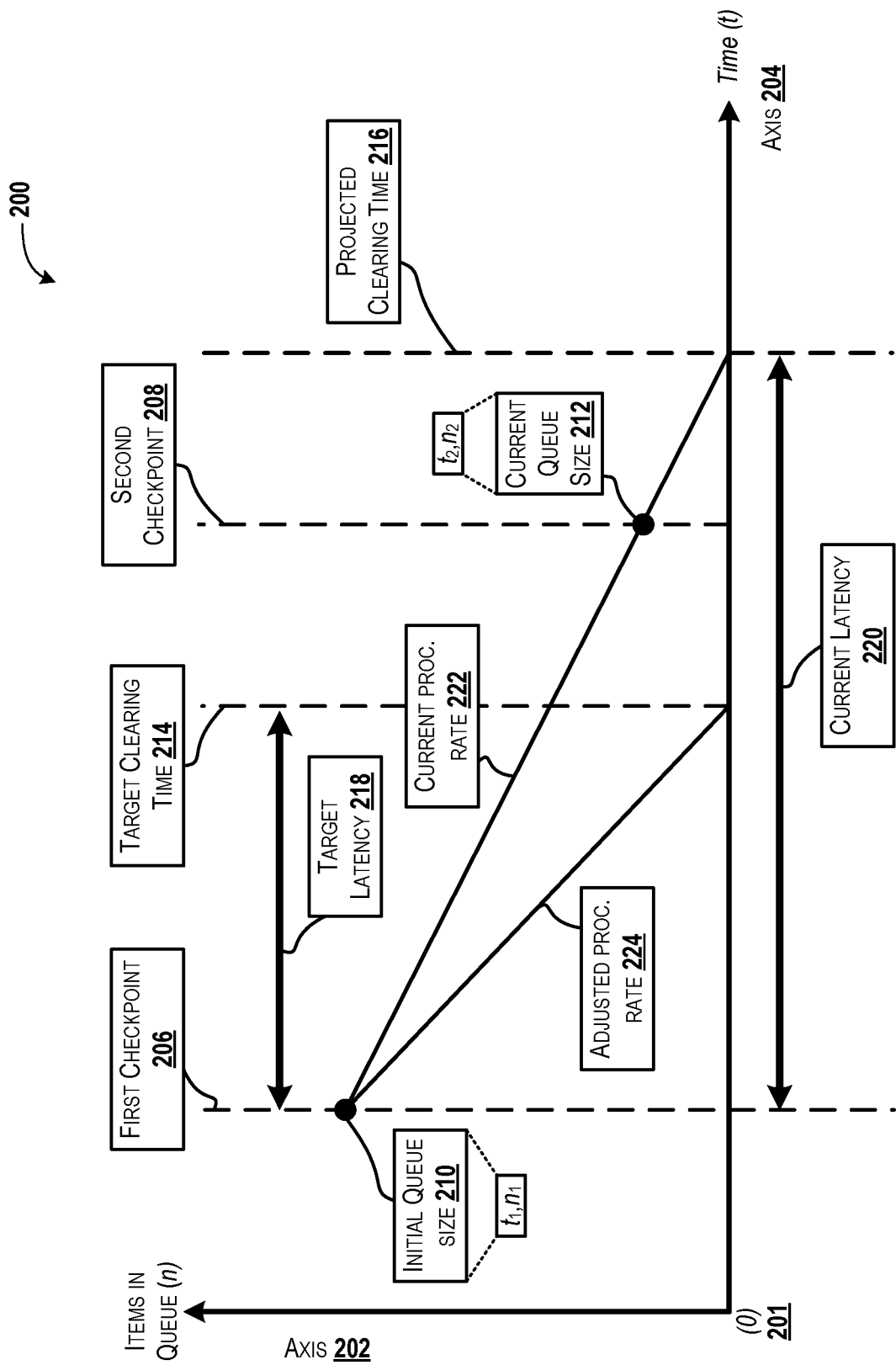
FIG. 2 is a chart diagram illustrating aspects for worker pool size management to support distributed load balancing for processing high-volume data streams, according to an illustrative embodiment.

Turning now to FIG. 2, with continued reference to FIG. 1, a chart diagram 200 for worker pool size management to support distributed load balancing for processing high-volume data streams is provided, according to an illustrative embodiment. The chart diagram 200 includes an axis 202 and an axis 204, where the axis 202 can provide a vertical axis and the axis 204 can provide a horizontal axis. Each of the axis 202 and the axis 204 extend outwards from an origin, such as the origin 201. The pool latency manager 130 can monitor the processing latency (i.e., the time between the arrival of raw data items 122A-N in the incoming queue 116 until the delivery of the processed results, such as the completed data items 160A-N, to the outgoing queue 118) periodically, such as at each checkpoint. For example, the chart diagram 200 can include a first checkpoint 206 and a second checkpoint 208 that each indicate a time at which the pool latency manager 130 can calculate a current processing latency, such as current latency 220 shown in FIG. 2 and indicated by the current latency indicator 136 shown in FIG. 1. The chart diagram 200 can also indicate a target latency 218 that corresponds with the target latency ceiling 134. The pool latency manager 130 can compare the current latency 220 with the target latency 218 (e.g., via comparison of the current latency indicator 136 with the target latency ceiling 134) to estimate the amount of WPTs that should be used to achieve the target latency 218.

In various embodiments, if the estimated amount of WPTs that are needed to satisfy the target latency 218 is larger than the current amount of WPTs currently operating (i.e., if the adjusted worker size 140 is larger than the current worker size 148), then the pool latency manager 130 can increase the size of the worker pool 150 by spawning new WPTs. In some embodiments, the worker pool 150 may have a configured maximum worker pool size authorized (i.e., a maximum amount of WPTs per worker pool). In various embodiments, if the estimated amount of WPTs that are needed to satisfy the target latency 218 is smaller than the current number of WPTs currently operating (i.e., if the adjusted worker size 140 is less than the current worker size 148), then the pool latency manager 130 can, in some embodiments, terminate existing WPTs within the worker pool 150, which may be subject to a possible minimum worker pool size limit (i.e., a minimum amount of WPTs required to operate per worker pool). The chart diagram 200 can include a current processing rate 222 that can be determined by the pool latency manager 130 as the number of raw data items 122A-N present in the incoming queue 116 at the first checkpoint 206 that were processed and delivered to the outgoing queue 118 by the time of the second checkpoint 208 (i.e., a current queue size 212 subtracted from an initial queue size 210) divided by the elapsed time between the two checkpoints (e.g., 30 seconds apart). The current latency 220 that is supported by the existing worker pool can be determined by the number of raw data items 122A-N in the incoming queue 116 at the time of the first checkpoint 206 divided by the current processing rate 222. Stated differently, the current latency 220 can estimate the time that it would take to process the total number of raw data items 122A-N in the incoming queue 116 to completion, which can be indicated by the projected clearing time 216.

In various embodiments, the current latency 220 can be compared with the target latency 218. If the current latency 220 exceeds the target latency 218, then the adjusted processing rate 224 needed to achieve a target clearing time 214 (i.e., a time in which the target latency 218 can be satisfied) will be larger than the current processing rate 222. The adjusted processing rate 224 can be determined by the number of raw data items 122A-N that were present at the first checkpoint 206 divided by the target latency 218. The adjusted worker size 140 that would achieve the adjusted processing rate 224 to satisfy the target latency 218 can be determined by the current worker size 148 multiplied by the ratio of the adjusted processing rate 224 to the current processing rate 222, such as shown below.

$$\text{New amount of } W.P.T.'s = (\text{Current amount of } W.P.T.'s) * \left(\frac{\text{Adj. Processing Rate}}{\text{Current Processing Rate}}\right)$$

The same determinations would apply if the current latency 220 is smaller than the target latency 218 (i.e., the current latency satisfies the target latency 218 but may be inefficient in its use of processing resources due to an excess amount of WPTs operating in the worker pool). In this example, the adjusted worker size 140 will be smaller than the current worker size 148, thereby causing the pool latency manager 130 to terminate instances of the WPTs of the worker pool 150 according to the adjusted worker size 140. Therefore, upon determining the adjusted worker size 140 for the worker pool 150 to satisfy the target latency 218 while optimizing the processing resources of the datacenter 110, the pool latency manager 130 can create (i.e., spawn) new WPTs or delete (i.e., terminate) existing WPTs accordingly.

In various embodiments, the time between the second checkpoint 208 and the first checkpoint 206 can be configured by taking into account how rapidly or slowly the arrival rate of new raw data items 122A-N to the incoming queue 116 changes. For example, if the rate at which raw data items are incoming to the incoming queue 116 varies dramatically on the time scale of minutes, then the first checkpoint 206 and the second checkpoint 208 being separated by a defined number of seconds (e.g., 30 seconds) may provide a sufficiently nimble adjustment ability to worker pool size so as to largely maintain processing latency below the target latency (i.e., the current latency 220 below the target latency 218). However, if the rate at which raw data items are incoming to the incoming queue 116 varies on the order of tens of seconds, then the time between the first checkpoint 206 and the second checkpoint 208 may be adjusted to be on the order of individual seconds so as to enable more frequent adjustments to the current worker pool size.

In some embodiments, variations to aspects of the worker pool sizing operations can be implemented. For example, the target latency 218 may be expressed as a percentage of raw data items that are to be completed (i.e., processed) within a prescribed limit (e.g., 90% rather than 100%), then the current latency 220 could be estimated as 0.9 times the number of raw data items in incoming queue 116 at the first checkpoint 206 divided by the current processing rate 222. By way of another example, in some embodiments, the chart diagram 200 can provide a second order or higher order estimation function that could be implemented in place of a linear estimation shown in FIG. 2. As another example, in some embodiments, limits could be imposed on the rate of change of the number of WPTs from one control cycle to the next (i.e., after the passage of time between the first checkpoint 206 and the second checkpoint 208), so as to avoid "ringing" (i.e., sudden, possibly unintended, change in input used for future estimations and analysis) or other control system effects. As yet another example, the time between checkpoints (e.g., the first checkpoint 206 and the second checkpoint 208) could be allowed to be adjusted automatically over time, such as in response to changes observed by the pool latency manager 130 in the short-term rate of change of the arrival rate of raw data items to the incoming queue 116. In various embodiments shown herein, the processing latencies (e.g., the current latency 220 and/or the target latency 218) has been measured in the time units of integer seconds, however this may not necessarily be the case for all embodiments. In some embodiments, the processing latency may be measured in milliseconds, and as such, the pool latency manager 130 may perform the same operations discussed herein on a millisecond scale. It is understood that the examples provided are for illustration purposes only, and therefore should not be construed as limiting in any way.

Figure 3:
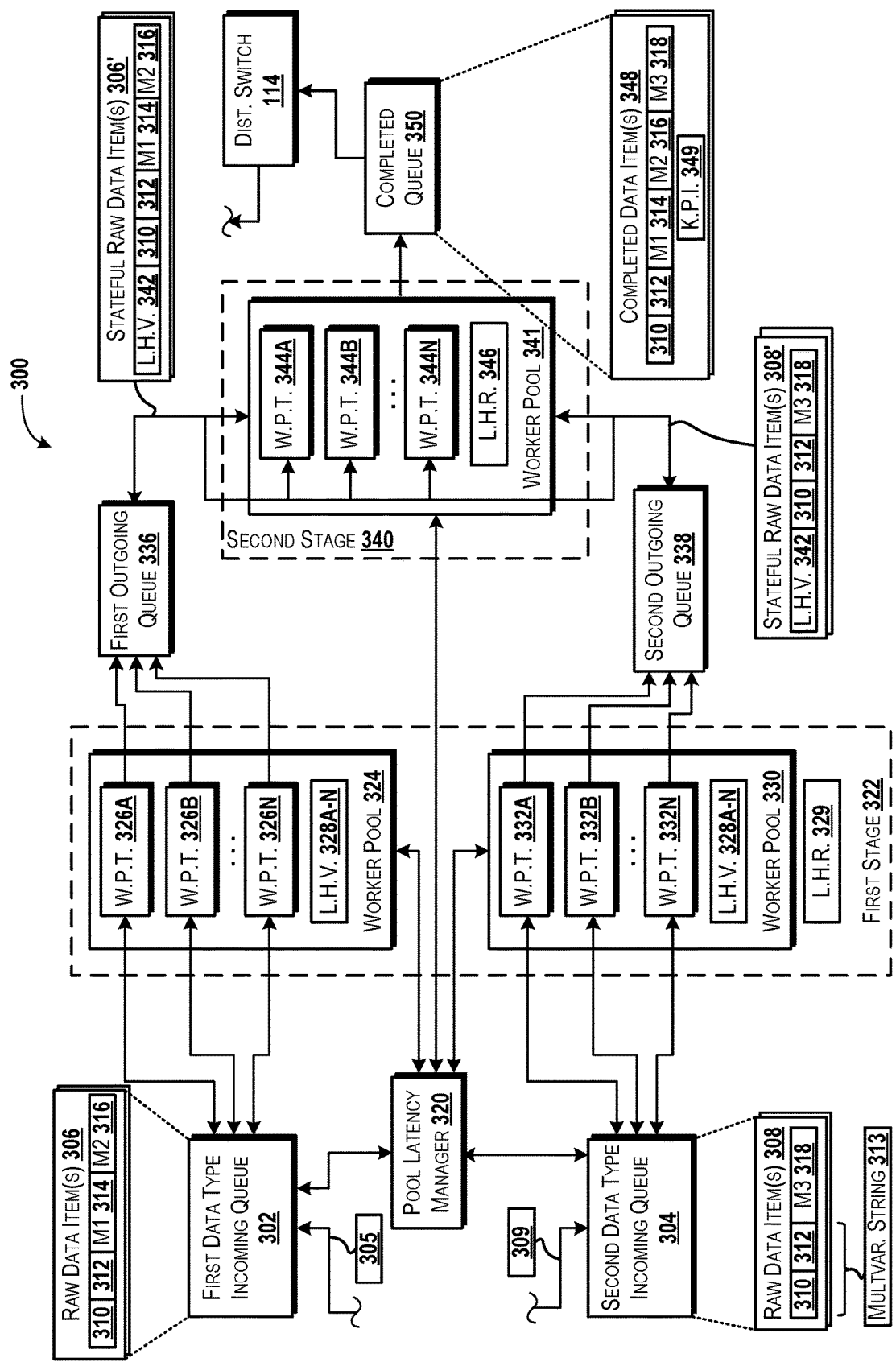
FIG. 3 is a block diagram illustrating an example operating environment in which aspects of distributed load balancing for stateful processing of high-volume data streams is provided, according to an illustrative embodiment.

Turning now to FIG. 3, with continued reference to at least FIG. 1, an operating environment 300 can provide distributed load balancing for stateful processing of high-volume data streams. The operating environment 300 can include elements which are substantially similar to the elements discussed with respect to the operating environment 100 shown in FIG. 1. For example, each of the worker pools 324, 330, and 341 may be configured to operate substantially similar to the worker pool 150. Each of the first data type incoming queue 302 and second data type incoming queue 304 can be configured to operate as the incoming queue 116. Each of a first data stream 305 and a second data stream 309 can be configured similar to the raw data stream 106. The pool latency manager 320 can be configured to operate similar to the pool latency manager 130. The raw data items 306 and 308 can be configured similar to the raw data items 122A-N. The WPTs 332A-N, 326A-N, and 344A-N can be configured similar to the WPTs 154A-N. The first outgoing queue 336, the second outgoing queue 338, and the completed queue 350 can be configured similarly to the outgoing queue 118. The operating environment 300 can include an instance of the distribution switch 114. As illustrated in FIG. 3, the first outgoing queue 336 and the second outgoing queue 338 can serve as incoming queues to the worker pool 341.

In various embodiments, aspects of the distributed load balancing approaches discussed with respect to the operating environment 100 may be used for processing raw data items in data streams that are "stateless," that is to say that processing of any incoming raw data item can be performed by any WPT of a worker pool independent of which one of the WPTs processed any previous raw data item. As such, various embodiments may perform loop operations using two or more sequential process flows, where the processing provided by a subsequent worker pool corresponds with a different analysis that is not necessarily dependent on the state or processing of the previous worker pool. Although many of the elements of the operating environment 300 can perform operations substantially similar to the operations discussed with respect to the operating environment 100, the network architecture configuration illustrated in the operating environment 300 may enable "stateful" processing of high-volume data streams without a front-end load balancer.

For example, in an embodiment, processing of an incoming raw data item includes generation of a key performance indicator (e.g., any of the key performance indicators 162A-N) for each record in the raw data item using only measurements already existing and contained in that record. In this situation, the worker pool can be configured such that any WPT can process a given raw data item independent of which WPT previously processed any particular raw data item. As such, no history or "state" information about the particular raw data item should be retained by a WPT (or worker pool) for use in processing other raw data items that arrive later, so there exists no need to steer any specific subsequent raw data items arriving later to that same WPT within the worker pool.

However, in some embodiments, a different type of processing flow scenario may require "stateful" processing in the sense that a relationship among two or more separate raw data items exists so as to necessitate the processing of the separate raw data items by the same worker in order to yield the correct completed data item. This can present technical challenges because the traditional approach that uses a front-end load balancer may attempt to interfere and redirect data on behalf of the worker pool. However, in embodiments of the present disclosure, the operating environments do not rely on front-end load balancing components, and therefore aspects of the present disclosure provide for stateful distributed load processing of high-volume data streams despite the lack of a front-end load balancer (and thus a lack of a single incoming data scheduler for distributing incoming data).

For example, as shown in FIG. 3, an incoming first data stream 305 corresponds with a first data type (e.g., a raw data item type 142A) and an incoming second data stream 309 corresponds with a second data type (e.g., a raw data item type 142B). The first data stream 305 may be internally directed by the SDN gateway 112 to the first data type incoming queue 302, and the second data stream 309 can be internally directed by the SDN gateway 112 to the second data type incoming queue 304. The first data stream 305 can provide the raw data item 306 that has a field 310, a field 312, a field 314, and a field 316. In an embodiment, the fields 310 and 312 can provide a unique identifier of a source device (e.g., a router identifier) and a generated data point (e.g., a timestamp measurement), respectively. The field 314 can indicate a first measurement "M1" and the field 316 can indicate a second measurement "M2." The second data stream 309 can provide a different file type from the first data stream 305, and as such, the second data stream 309 can include the raw data item 308. In an embodiment, the raw data item 308 includes at least some identical fields as the raw data item 306, such as the field 310 and 312. This can indicate that the raw data items 306 and 308 pertain to and/or were generated by the same source device (e.g., a client device 104 configured as a router). In some embodiments, the raw data item 308 can further include a field 318 that provides a third measurement "M3."

For this example, stateful processing can be provided via implementation of two stages, both of which may be considered "stateless" in isolation, however when combined, can yield "stateful" processing. The operating environment 300 can provide a first stage 322 and a second stage 340. The first stage 322 can include two worker pools, such as the worker pool 324 that is in direct communication with the first data type incoming queue 302 and the worker pool 330 that is in direct communication with the second data type incoming queue 304. The worker pool 324 can include a plurality of WPTs 326A-N and the worker pool 330 can include a plurality of WPTs 332A-N. The pool latency manager 320 can perform operations similar to those discussed with respect to the pool latency manager 130 of FIG. 1. As such, each of the WPTs 326A-N and 332A-N may be assigned and allotted a load hash subrange (not shown) for distributed processing. To enable stateful processing without a front-end load balancer, each of the worker pools 324 and 330 can configure the WPTs 326A-N and 332A-N to execute the same load hash routine 329 that instructs the WPTs 326A-N and 332A-N to analyze the fields 310 and 312, and concatenate each of the fields 310, 312 together (e.g., concatenation of the router identifier and timestamp measurement) because both of the fields 310, 312 are shared by the raw data items 306, 308. The concatenated fields 310, 312 can be used to assemble a multivariate string, such as the multivariate string 313. Each of the WPTs 326A-N and 332A-N can invoke the load hash routine 329 to transform the multivariate string 313 into a load hash value 342 (i.e., which is one of the load hash values 328A-N) which is the same for both of the raw data items 306, 308. It is understood that, collectively, the load hash values 328A-N can form a load hash set, and thus each WPTs every worker pool can generate, independent of each other, an instance of the load hash set. Each of the WPTs 326A-N and 332A-N can compare the load hash value 342 to their assigned load hash subranges. One WPT within each of the worker pools 324 and 330 will process the raw data items 306, 308, respectively, based on the load hash value 342 falling within the assigned load hash subrange. In this example, the output data that is yielded from the worker pools 324, 330 can be referred to as a stateful raw data item 306' and 308' from the first outgoing queue 336 and the second outgoing queue 338, respectively. Each of the stateful raw data items 306' and 308' can include a new field that stores the same load hash value 342. The "new field" may be referred to as a "stateful field" that includes the load hash value 342. To obtain the new field, each of the worker pools 324 and 330 can append the load hash value 342 to the raw data items 306 and 308, respectively. Therefore, the WPT of the worker pool 330 can append the load hash value 342 to match the load hash value 342 provided by a parallel WPT of a parallel worker pool in the first stage 322 (i.e., worker pool 324). By this, two stateful raw data items are created by multiple worker pools in parallel (within the first stage 322) without a front-end load balancer. Each of the first worker pool and second worker pool (e.g., the worker pools 324, 330, respectively) can be configured to operate in parallel and each be in direct communication with a serial, subsequent worker pool in a second stage (e.g., the worker pool 341 of the second stage 340 that is communicatively coupled, directly, in series with the first worker pool and second worker pool of the first stage 332) via the first outgoing queue 336 and the second outgoing queue 338. It is understood that the first outgoing queue 336 and the second outgoing queue 338 may serve as incoming queues for the second stage 340.

In the second stage 340, each of the WPTs 344A-N may be directly connected to both the first outgoing queue 336 and the second outgoing queue 338. The WPTs 344A-N form the third worker pool (e.g., the worker pool 341) in the second stage 340. The WPTs 344A-N, and thus the third worker pool, is configured in a serial communication sequence relative to the first and second worker pools of the first stage 322 (e.g., each of the WPTs 326A-N of the worker pool 324 and each of the WPTs 322A-N of the worker pool 330). As such, the WPTs of the worker pool 341 can use as input queues the first outgoing queue 336 and the second outgoing queue 338. Each of the WPTs 344A-N is assigned a load hash subrange by a pool latency manager, such as the pool latency manager 320. For the first outgoing queue 336, each WPT analyzes and processes the stateful raw data item 306' according to whether the load hash value 342 that was appended during the first stage 322 falls within the particular WPT's assigned load hash subrange, and the WPT ignores all other records in the first outgoing queue 336. Similarly, for the second outgoing queue 338, each of the WPTs may analyze the load hash value 342 of the stateful raw data item 308' and the WPT who has a corresponding load hash subrange will process the raw data item 308' while ignoring or otherwise omitting the remaining items in the second outgoing queue 338. One of the WPTs 344A-N will process and generate the completed data item 348 based on the three measurements found in the fields 314, 316, and 318. One of the WPTs 344A-N can generate the completed data item 348 so as to create and append a key performance indicator 349, while also dumping (i.e., removing) the new field that includes the load hash value 342.

Note that, aspects of the embodiment of the operating environment 300 can cause the raw data items 306, 308, which have the same fields 310, 312 with identical information included therein (i.e., the key fields on which the concatenation and joining enables matching of the raw data items 306, 308 in separate queues without a single, front-end load balancer), to be processed by the same WPT in the worker pool 341 of the second stage 340, which in turn enables the WPT of the third worker pool (i.e., worker pool 341) in the second stage 340 to generate the key performance indicator 349 based on the combination of measurements from fields 314, 316, and 318. Additionally, aspects of the present disclosure enable worker pools to be employed in each of the first stage 322 and the second stage 340, and thus can enable scaling according to the size of the offered incoming volume of data because there exists no fixed requirement that all incoming data from the first data stream 305 and second data stream 309 to go to a single WPT. Stated differently, aspects of the present disclosure can enable any of the WPTs within the worker pool to yield the same output as discussed here, thereby providing "stateful" processing with load balancing across worker pools without depending on a front-end load balancer evaluating every incoming raw data item. In some embodiments, a single WPT may have sufficient capacity to handle the joining of the fields 310, 312 so as to ensure that all related raw data items from the first data type incoming queue 302 and the second data type incoming queue 304 arrive at the same WPT in the first stage 322. However, if multiple WPTs are needed to join and concatenate the fields 310, 312 due to a high arrival rate of incoming data with different types, readjustment of the amount of WPTs in the worker pool may be provided.

Figure 4A:
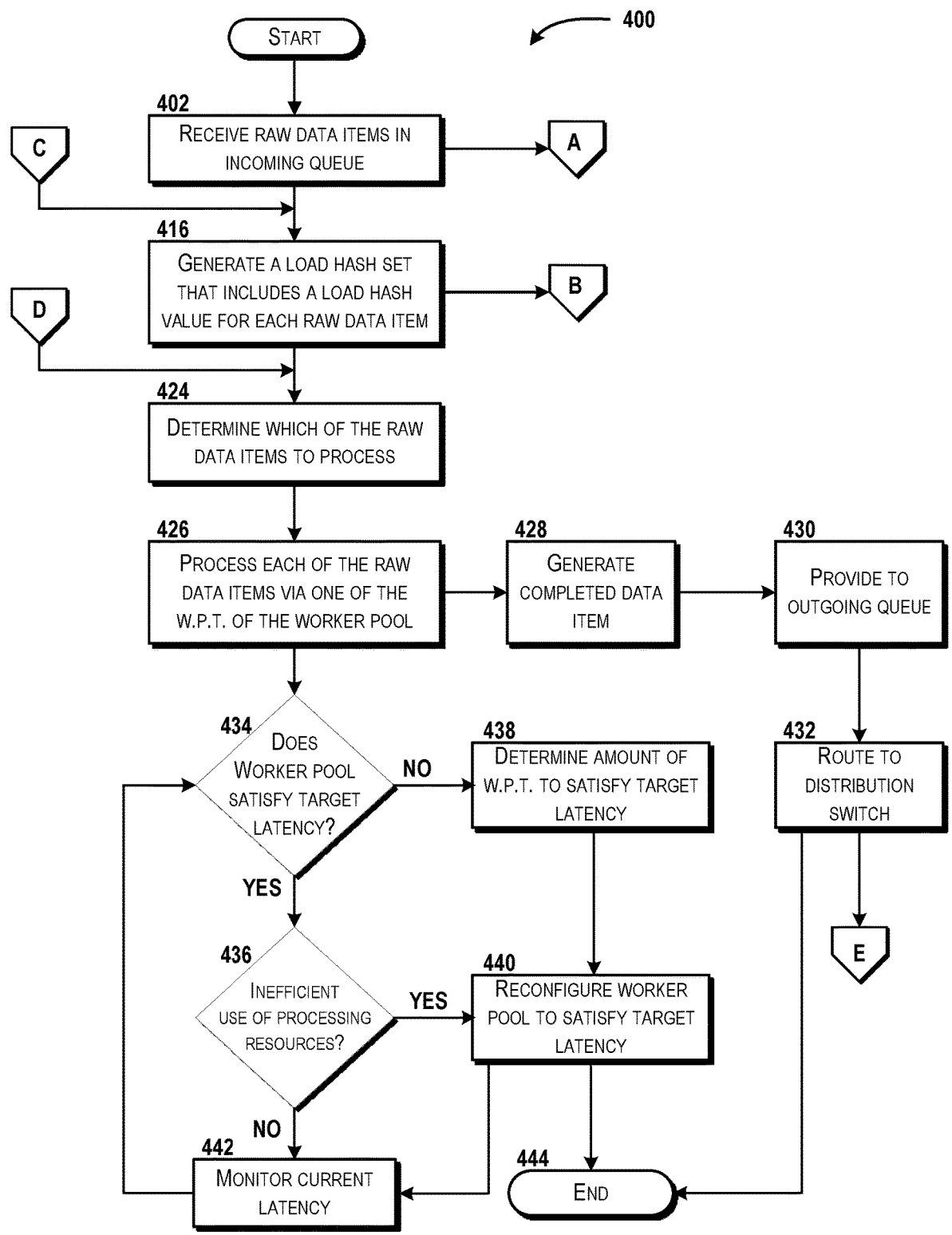
FIGS. 4A and 4B provide a flow diagram illustrating aspects of a method for distributed load balancing for processing of high-volume data streams, according to an illustrative embodiment.
Figure 4B:
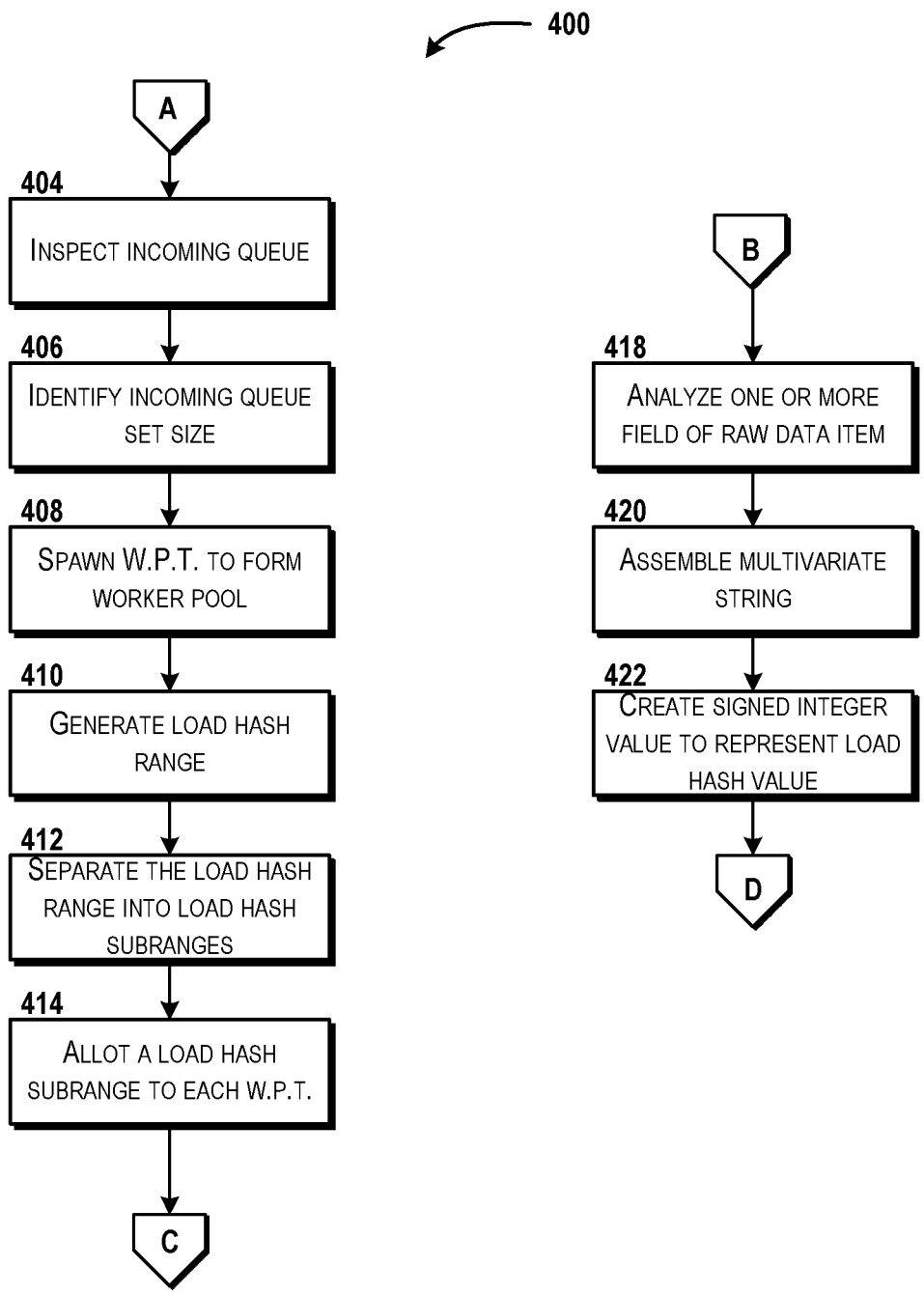
Figure 4C:
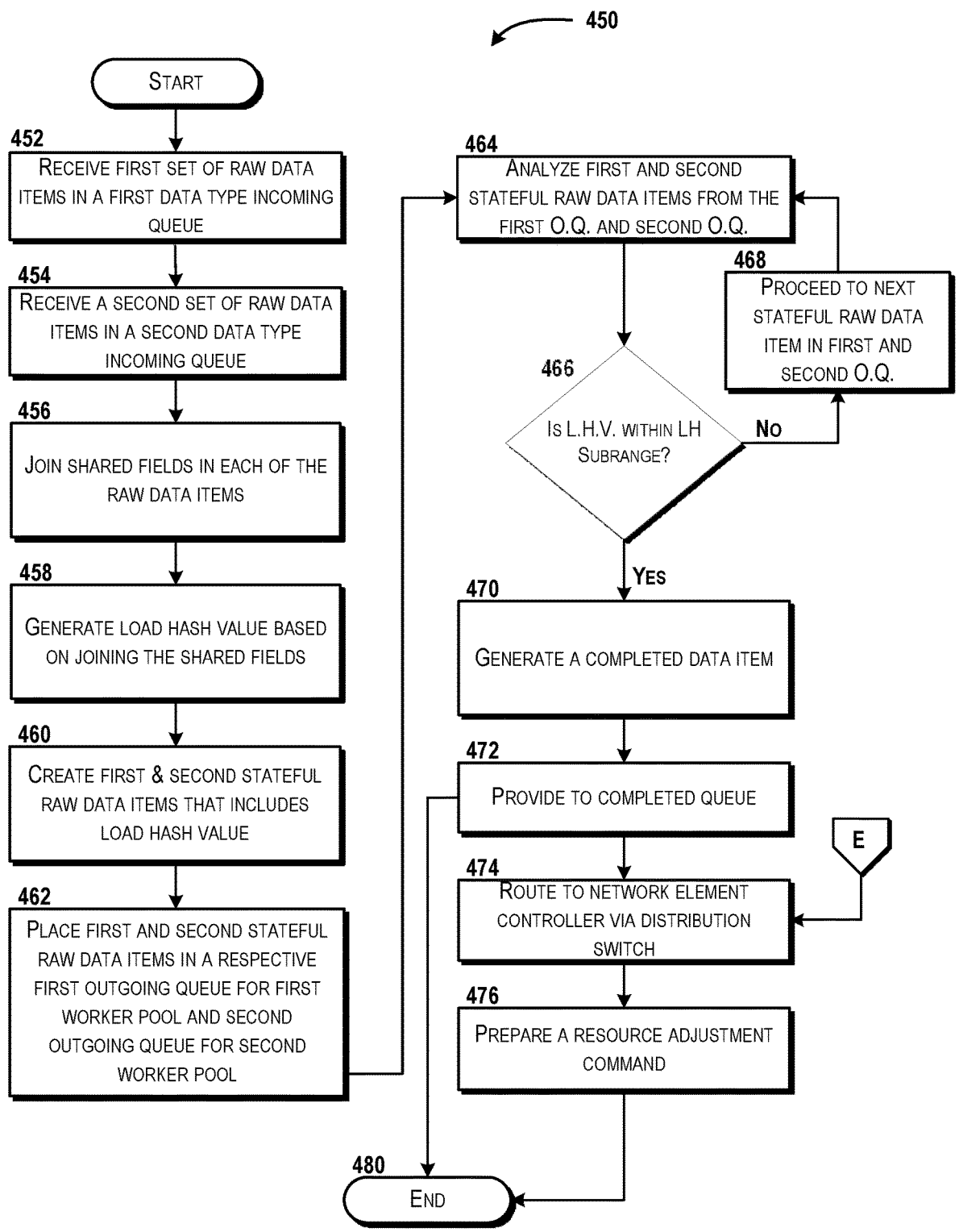
FIG. 4C is a flow diagram illustrating aspects of another method for distributed load balancing for stateful processing of high-volume data streams, according to an illustrative embodiment.

Turning now to FIGS. 4A, 4B, and 4C, with continued reference to FIGS. 1-3, aspects of a method 400 for distributed load balancing for processing of high-volume data streams and a method 450 for distributed load balancing for stateful processing of high-volume data streams will be described in detail, according to illustrative embodiments. It should be understood that each of the operations of the one or more methods disclosed herein (e.g., the method 400 and/or the method 450 discussed below) are not necessarily presented in any particular order and that performance of some or all of the operations in an alternative order(s) is possible and is contemplated. It is also understood that any of the operations from the methods disclosed herein may be combined or otherwise arranged to yield another embodiment of a method that is within the scope of the concepts and technologies discussed herein. The operations have been presented in the demonstrated order for ease of description and illustration, and therefore should not be construed as limiting the various embodiments disclosed herein. Operations may be added, omitted, and/or performed simultaneously and/or sequentially, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions stored and included on a computer storage medium, as defined herein. The term "computer-readable instructions," and variants thereof, as used herein, is used expansively to include routines, applications, application modules, program modules, programs, components, data structures, algorithms, and the like. It is understood that use of the term "module" refers to a defined, callable set of computer-readable instructions that provide the performance of one or more operations and functions discussed herein so as to transform, upon execution, processing resources and/or memory resources into a particular, non-generic, machine. Computer-readable instructions can be implemented on various system configurations including single-processor or multiprocessor systems, minicomputers, user equipment, mainframe computers, personal computers, network servers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing and transforming a processor of a computing system or device, such as any element within the datacenter 110 (e.g., the host servers 170 and any of the worker processing threads 154A-B supported within the datacenter 110), the network 102, the worker pool 150, the worker pool 330, the worker pool 324, and/or the worker pool 341, to perform one or more operations and/or causing the processor to direct other components of the computing system or device to perform one or more of the operations.

For purposes of illustrating and describing the concepts of the present disclosure, the methods disclosed herein are described as being performed by one or more instance of the host server 170 via execution of one or more software modules (i.e., executable data processes that instruct and transform a processor) such as, for example, the pool latency manager 130, the load hash routine 152, and instances of worker processing threads (e.g., any of the WPT 154A-N) that configure one or more processors 172 of the host server 170 within the datacenter 110. It should be understood that additional and/or alternative devices and/or network elements can, in some embodiments, provide the functionality described herein via execution of one or more modules, applications, and/or other software including, but not limited to, the other instances of the host server 170 within and/or outside the datacenter 110. Thus, the illustrated embodiments are illustrative, and should not be viewed as being limiting in any way. The methods 400 and 450 will be described with reference to one or more of the FIGS. 1, 2, and 3.

Turning now to FIGS. 4A and 4B, the method 400 for distributed load balancing for processing high-volume data streams without a front-end load balancer is provided, according to an embodiment. The method 400 begins and proceeds to operation 402, where the incoming queue 116 receives the raw data stream 106 that provides instances of the raw data items 122A-N for processing by the datacenter 110. The incoming queue 116 can be in direct communication with each of the plurality of WPTs 154A-N that form the worker pool 150. In some embodiments, the method 400 proceeds from operation 402 to operation 404, which is shown in FIG. 4B. In some embodiments, the method 400 may proceed from operation 402 to operation 416, although this may not necessarily be the case for all embodiments. For clarity, a discussion of operation 404 will be provided first, followed by a discussion of operation 416 below.

At operation 404, the pool latency manager 130 can inspect the incoming queue 116 to determine how many raw data items exist and/or are being received from the raw data stream 106 within the incoming queue 116. From operation 404, the method 400 may proceed to operation 406, where the pool latency manager 130 can determine the incoming queue set size 126 based on an amount of the raw data items that are present within the incoming queue 116. From operation 406, the method 400 may proceed to operation 408, where the pool latency manager 130 can determine an amount of WPTs that should operate in the worker pool 150 so as to satisfy a target latency parameter, such as indicated by the target latency ceiling 134, for the worker pool 150. In various embodiments, the pool latency manager 130 can spawn two or more WPTs (e.g., any of the WPTs 154A-N) based on the amount that would satisfy the target latency parameter and conform to the target latency 218. From operation 408, the method 400 may proceed to operation 410, where the pool latency manager 130 can generate the load hash range 132 for the worker pool 150. From operation 410, the method 400 may proceed to operation 412, where the pool latency manager 130 can separate the load hash range 132 in to a plurality of load hash subranges, such as the load hash subranges 144A-N. The total amount of load hash subranges 144A-N can match the number of WPTs 154A-N that were spawned and currently operating within the worker pool 150. From operation 412, the method 400 may proceed to operation 414, where the pool latency manager 130 can allot one of the plurality of load hash subranges 144A-N to each of the plurality of WPTs 154A-N within the worker pool 150 such that each WPT corresponds with one of the load hash subranges 144A-N. In some embodiments, the allotting may occur without the pool latency manager 130 performing analysis of the raw data items 122A-N within the incoming queue 116, and therefore the pool latency manager 130 does not calculate any load hash values based on any of the raw data items 122A-N within the incoming queue 116.

From operation 414, the method 400 may proceed to operation 416, where each of the plurality of WPTs 154A-N of the worker pool 150 can independently generate a load hash set 129 based on the raw data items 122A-N within the incoming queue 116. The load hash set 129 can include the corresponding load hash value for each of the raw data items in the incoming queue. In various embodiments, generating the load hash set 129 includes determining the load hash value for each of the raw data items 122A-N via the execution of one or more operations 418-422. In some embodiments, the method 400 may proceed from operation 416 to operation 418, which is shown in FIG. 4B. In some embodiments, the method 400 may proceed from operation 416 to operation 424, although this may not necessarily be the case for all embodiments. For clarity, a discussion of operation 418 will be provided first, followed by a discussion of operation 424 below.

At operation 418, the each of the WPTs 154A-N can analyze one or more fields within a raw data item. In some embodiments, each of the WPTs 154A-N may determine the raw data item type corresponding to each of the raw data items 122A-N. By this, each of the WPTs 154A-N can identify which fields should be used to assemble a multivariate string, such as one of the multivariate strings 127A-N.

From operation 418, the method 400 may proceed to operation 420, where each of the WPTs 154A-N independently assembles a multivariate string for each of the raw data items 122A-N, where the multivariate string (e.g., any of the multivariate strings 127A-N) can represent the corresponding raw data item based on the one or more fields that were analyzed. In some embodiments, two or more fields can be concatenated together so as to form a multivariate string.

From operation 420, the method 400 may proceed to operation 422, where each of the WPTs 154A-N can create a signed integer value that provides and represents the load hash value for the corresponding raw data item. Stated differently, each of the WPTs 154A-N can create a load hash value that indicates a signed integer value based on transformation of the multivariate string. Each of the signed integer values (i.e., load hash values) falls within one of the plurality of load hash subranges 144A-N that is allotted to one of the WPTs 154A-N of the worker pool 150. For example, each of the WPTs 154A-N may extract, concatenate, or otherwise use information from one or more fields of the raw data items 122A-N to provide one of the multivariate strings 127A-N. The multivariate strings 127A-N can be processed through the load hash routine 152 to yield the load hash values 128-N, respectively. As such, the load hash values 128A-N are based on transformation of the multivariate strings 127A-N, respectively, for the corresponding raw data items 122A-N, respectively.

From operation 422, the method 400 may proceed to operation 424, where each of the WPTs 154A-N determines which of the raw data items 122A-N from the incoming queue 116 to process based on the corresponding load hash value from the load hash set (e.g., one of the load hash values 128A-N which matches the load hash subrange 144A-N allotted to a particular WPT). Therefore, raw data items which have load hash values that fall within the load hash subrange for a particular WPT will be processed by that WPT of the worker pool. As such, when the load hash value for a raw data item falls outside of the load hash subrange allotted to the particular WPT, then those instances of raw data items will be ignored or otherwise not processed by the particular WPT, but instead by one of the other WPTs of the worker pool 150. By this, each of the raw data items will be processed by one of the WPTs of the worker pool 150 because one of the load hash subranges 144A-N will cover (or otherwise span) the load hash value of a raw data item. Each of the WPTs 154A-N can generate a load hash value for every raw data item in the incoming queue 116, and as such, each of the WPTs 154A-N generates, independently, an instance of the load hash set 129 that includes the plurality of load hash values 128A-N that collectively corresponds with all of the raw data items 122A-N in the incoming queue 116 (i.e., the raw data items 122A-N that make up the incoming queue set 120).

From operation 424, the method 400 may proceed to operation 426, where the WPTs 154A-N can process one or more of the raw data items 122A-N such that the processing of each of the raw data items 122A-N in the incoming queue 116 occurs within one of the WPTs 154A-N of the worker pool 150 based on the corresponding load hash value. In some embodiments, from operation 414, the method 400 may proceed to operation 428. In some embodiments, the method 400 may proceed from operation 426 to operation 434. For clarity, a discussion of operation 428 will be provided first, followed by discussion of operation 434 below.

At operation 428, each of the WPTs 154A-N can generate a completed data item based on a raw data item. As such, each of the raw data items 122A-N is processed by one of the WPTs 154A-N, which in turn transforms the raw data items 122A-N into the completed data items 160A-N, respectively. From operation 428, the method 400 may proceed to operation 430, where each of the WPTs 154A-N can provide the completed data item that they generated to the outgoing queue 118 such that collectively, the entire incoming queue set 120 is processed by the worker pool 150. Stated differently, one or more of the WPTs 154A-N may process one or more of the raw data items 122A-N so as to generate one or more of the completed data items 160A-N. From operation 430, the method 400 may proceed to operation 432, where the outgoing queue 118 can route the completed data items 160A-N to the distribution switch 114 and towards a final target destination, such as any of the client device 104, the network access point 103, or any other element within or outside the datacenter 110. From operation 432, the method 400 may proceed to operation 444, where the method 400 may end. In some embodiments, the method 400 may proceed from operation 432 to one or more operation of method 450 shown in FIG. 4C, such as operation 474.

Returning to operation 426, the method 400 may proceed to operation 434, where the pool latency manager 130 can determine whether the worker pool 150 satisfies the target latency, such as the target latency 218. For example, the pool latency manager 130 can generate and/or update the current latency indicator 136 using the difference in time between completed time indicators 156A-N and the arrival time indicators 124A-N so as to yield the current latency indicator 136, which corresponds with the current latency 220. The current latency indicator 136 can be compared with the target latency ceiling 134, which corresponds with the target latency 218, so as to confirm that the current latency indicator 136 is below the target latency ceiling 134, thereby satisfying the target latency 218. In an embodiment in which the target latency 218 is not satisfied, such as when the current latency indicator 136 is above (i.e., greater than) the target latency ceiling 134, then the method 400 may proceed along the NO path to operation 438.

At operation 438, the pool latency manager 130 may determine the amount of instances of WPTs that should operate and execute within the worker pool 150 in order to satisfy the target latency 218. For example, the pool latency manager 130 can determine the current worker size 148, the current processing rate 146 (which corresponds with the current processing rate 222 shown in FIG. 2), and the adjusted processing rate 138 (which corresponds with the adjusted processing rate 224 shown in FIG. 2). Using the equation (1) discussed in FIG. 2, the pool latency manager 130 can determine the adjusted worker size 140, which corresponds with the amount of WPTs that are needed to satisfy the target latency 218 (which corresponds with the target latency ceiling 134). From operation 438, the method 400 may proceed to operation 440. If operation 440 is preceded by operation 438, then the pool latency manager 130 can reconfigure the worker pool 150 such that the target latency parameter (i.e., the target latency ceiling 134) is satisfied, specifically by spawning a new amount of WPTs within the worker pool 150 such that the total WPTs within the worker pool 150 matches the amount determined in operation 438. By this, the target latency 218 can be satisfied. In some embodiments, the method 400 may proceed from operation 440 to operation 444, where the method 400 can end.

Returning to operation 434, if the pool latency manager 130 determines that the worker pool 150 satisfies the target latency 218, then the method 400 may proceed along the YES path to operation 436, where the pool latency manager 130 can determine whether a worker pool instance (e.g., the worker pool 150) is inefficiently using processing resources due to an excess amount of worker processing threads in the worker pool 150. Specifically, the pool latency manager 130 may determine how close the current latency indicator 136 is to the target latency ceiling 134, thereby providing an indication as to whether the worker pool 150 could still satisfy the target processing latency (as indicated by the target latency ceiling 134) using less than the current amount of worker processing threads. In an embodiment, the pool latency manager 130 may assign a specific percentage of the target latency ceiling 134 (e.g., 80% of the target latency ceiling 134, or another percentage) as an indicator of when the worker pool 150 should be reconfigured to reduce the amount of WPTs in the worker pool 150 while still maintaining conformance with the target latency ceiling 134. In some embodiments, when the pool latency manager 130 determines that the worker pool 150 is efficiently using processing resources (e.g., due to the current latency indicator 136 being within a defined percentage of the target latency ceiling 134, such as 95% of the target latency), then the method 400 may proceed along the NO path to operation 442. At operation 442, the pool latency manager 130 can continue to monitor the current latency indicator 136 on an (a)periodic basis to as to ensure that the worker pool 150 is on target to satisfy the target latency (i.e., provide processing below the target latency ceiling 134). From operation 442, the method 400 may proceed to operation 434.

Returning to operation 436, the pool latency manager 130 may determine that the worker pool 150 is inefficiently using processing resources because the current latency indicator 136 shows that the worker pool 150 is below the target latency ceiling 134 (e.g., below a defined percentage of the target latency ceiling 134, such as below 80%, 70%, etc.) due to too many worker processing threads executing within the worker pool 150, thereby satisfying the target latency through excess usage of an amount of processing resources of the datacenter 110. As such, if the pool latency manager 130 determines that the worker pool 150 can satisfy the target processing latency with a reduced amount of worker processing threads, then the method 400 may proceed along the YES path to operation 440.

In an embodiment in which the operation 440, is preceded by operation 436, the pool latency manager 130 may reconfigure the worker pool 150 such that the target latency parameter is satisfied, while also being within a defined percentage of the target latency ceiling 134 (e.g., within 90% of the target latency). The pool latency manager 130 can reconfigure the worker pool 150 by determining the adjusted worker size 140, such as via invocation and execution of equation (1) shown in FIG. 2, to yield a total amount of WPTs that should be executing within the worker pool 150 to bring the current latency within the defined threshold of the target latency. The pool latency manager 130 can terminate one or more worker processing threads from among the plurality of currently executing worker processing threads within the worker pool 150 so as to conform with the adjusted worker size 140. In some embodiments, the method 400 may proceed from operation 440 to operation 442, which is discussed above. In some embodiments, from operation 440, the method 400 may proceed to operation 444, where the method 400 can end.

Turning now to FIG. 4C, a method 450 for distributed load balancing for stateful processing of high-volume data streams without a front-end load balancer is provided, according to an embodiment. In some embodiments, the method 450 can proceed from any of the operations discussed above with respect to the method 400. In some embodiments, one or more operations of the method 400 can occur prior to one or more operations of the method 450 discussed above. It should be understood that the examples provided are for illustration purposes only, and therefore should not be construed as limiting in any way.

The method 450 can begin and proceed to operation 452, where a first set of raw data items are received in a first data type incoming queue, such as the raw data items 306 being received in the first data type incoming queue 302. From operation 452, the method 450 may proceed to operation 454, where a second set of raw data items are received in a second data type incoming queue, such as the raw data items 308 being received in the second data type incoming queue 304.

From operation 454, the method 450 may proceed to operation 456, where each of the WPTs from a first worker pool (e.g., the WPTs 326A-N of the worker pool 324) can join two or more shared fields in each of the raw data items 306, and each of the WPTs from a second worker pool (e.g., the WPTs 332A-N of the worker pool 330) can join two or more shared fields in each of the raw data items 308. The process of joining is configured to yield the same multivariate string 313 between the two worker pools.

From operation 456, the method 450 may proceed to operation 458, where each of the WPTs in each of the first worker pool and second worker pool can generate a load hash value 342 based on the multivariate string 313 that was created by joining the shared fields.

From operation 458, the method 450 may proceed to operation 460, where each of the first and second worker pools (e.g., the worker pools 324, 330) can create a first and second stateful raw data items (e.g., the stateful raw data items 306' and 308') that includes the load hash value 342. The WPT that is operating in each of the worker pools 324, 330 can transform the multivariate string 313 into the load hash value 342 and append the load hash value 342 to the corresponding raw data item from the incoming queues so as to create the first and second stateful raw data items. Thus, each WPT handling the raw data item in the respective first and second worker pools (e.g., one of the WPTs 326A-N of the worker pool 324 and one of the WPTs 332A-N of the worker pool 330) can append the load hash value 342 to the respective raw data item (e.g., the raw data items 306 and 308) so as to match the load hash value in the parallel worker pool (i.e., so that the load hash value 342 created and appended for the stateful raw data item 306' matches the load hash value 342 created and appended for the stateful raw data item 308').

From operation 460, the method 450 may proceed to operation 462, where the first and second stateful raw data items (e.g., the stateful raw data items 306' and 308') can be provided to a first outgoing queue and second outgoing queue for a respective first worker pool and second worker pool (e.g., the outgoing queues 336, 338 for the worker pools 324, 330, respectively).

From operation 462, the method 450 may proceed to operation 464, where WPTs from the third worker pool of the second stage (e.g., the WPTs 344A-N of the worker pool 341 form the second stage 340) can obtain and analyze the first and second stateful raw data items from the first and second outgoing queue (e.g., the WPTs 344A-N of the worker pool 341 of the second stage 340 analyzing the stateful raw data items 306' and 308' from the outgoing queues 336, 338, respectively), specifically identifying the commonly shared load hash value 342. The first and second outgoing queues 336, 338 are provided in parallel with each other and each are in direct serial communication with the each of the WPTs of the first worker pool and second worker pool, respectively (e.g., the WPTs 326A-N of the worker pool 324 and WPTs 332A-N of the worker pool 330). The WPTs 344A-N of the third worker pool (e.g., the worker pool 341) in the second stage 340 (which may be referred to as a "stateful" stage) are provided in direct serial communication with the first outgoing queue 336 and second outgoing queue 338, thereby enabling stateful processing without a front-end load balancer.

From operation 464, the method 450 may proceed to operation 466, where each of the WPTs 344A-N can determine whether the load hash value 342 falls within the load hash subrange assigned to each of the WPTs 344A-N. If a WPT determines that the load hash value 342 does not correspond with the assigned load hash subrange, then that WPT does not process the stateful raw data item, and proceeds along the NO path to operation 468, where the WPT proceeds to the next stateful raw data item in the first and second outgoing queue. From operation 468, the method proceeds to operation 464.

Returning to operation 466, if the particular WPT determines that the load hash value 342 corresponds with the particular WPT's load hash subrange, then the WPT proceeds along the YES path to operation 470. At operation 470, the WPT can generate the completed data item 348 via creation of the key performance indicator 349 based on the combined analysis of the fields 314, 316, and 318, as well as removal of the load hash value 342.

From operation 470, the method 450 may proceed to operation 472, where the WPT that provided the processing in worker pool 341 can provide the completed data item 348 to the completed queue 350, which may be configured as an instance of the outgoing queue 118. In some embodiments, the method 450 may proceed from operation 472 to operation 480, where the method 450 may end. In some embodiments, the method 450 may proceed to from operation 472 to operation 474.

At operation 474, the completed data item 348 may be routed, via the distribution switch 114, to the network element controller 177 shown in FIG. 1. From operation 474, the method 450 may proceed to operation 476, where the network element controller 177 can analyze the completed data item 348 and based on the key performance indicator 349, may prepare the resource adjustment command 178 that instructs a network element (e.g., the network access point 103) to adjust, alter, or otherwise reconfigure the amount of processing resources that are being consumed so as to improve the operation of the network 102 and/or datacenter 110. From operation 476, the method 450 may proceed to operation 480, where the method 450 can end.

Figure 5:
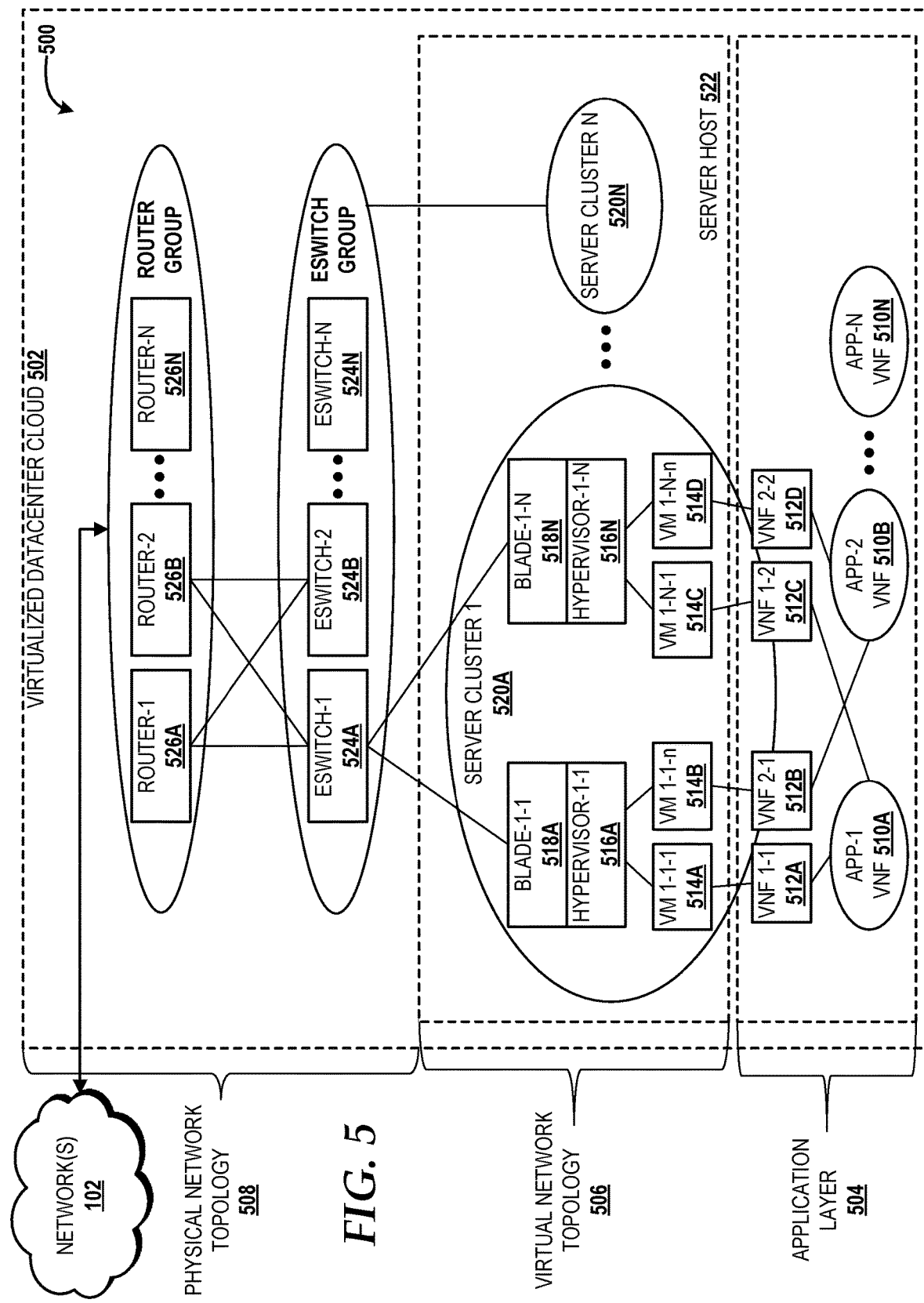
FIG. 5 is a diagram illustrating a network topology for a virtualized datacenter cloud capable of implementing aspects of the concepts and technologies described herein according embodiments of the present disclosure.

Turning now to FIG. 5, a network topology 500 for a virtualized datacenter cloud 502 will be described, according to an illustrative embodiment. In some embodiments, at least a portion of the datacenter 110 can be configured according to embodiments of the network topology 500. The illustrated network topology 500 includes three layers: an application ("APP") layer 504, a virtual network topology layer 506, and a physical network topology layer 508. The APP layer 504 can include one or more application virtualized network function ("VNFs") 510A-510N, each of which can be divided to one or more sub-VNFs 512A-512D (referred to herein collectively as sub-VNFs 512) to be executed by one or more VMs 514A-514D (referred to herein collectively as VMs 514), such as, in some embodiments, one or more of the worker processing threads 154A-N. In context of the concepts and technologies disclosed herein, the VNFs 510A-510N can include virtual processing network functions for one or more worker processing threads 154A-N of the datacenter 110.

The virtual network topology layer 506 includes the VMs 514, one or more hypervisors 516, and one or more server modules ("blades") 518A-518N (referred to herein collectively as blades "518"). Each blade 518 can support one hypervisor 516A-516N (referred to herein collectively as hypervisors "516") that, in turn, can manage one or more of the VMs 514. The blades 518 provide computing capacity to support the VMs 514 carrying the sub-VNFs 512. The hypervisors 516 provide resource management among the VMs 514 supported thereby. A logical server cluster 1 520A is created for resource allocation and reallocation purposes, which includes the blades 518 in the same instance of the server host 522. Each instance of the server host 522 includes one or more of the logical server clusters 1-N 520A-520N.

The physical network topology layer 508 includes an Ethernet switch ("ESwitch") group, including one or more ESwitches 524A-524N (referred to herein collectively as ESwitches "524"). The physical network topology layer 508 also includes a router group, including one or more routers 526A-526N (referred to herein collectively as routers "526"). The ESwitch group provides traffic switching function among the blades 518. The router group provides connectivity for traffic routing between the virtualized datacenter cloud 502 and the network 102. The routers 526 may or may not provide multiplexing functions, depending upon network design. In some embodiments, the physical network topology layer 508 can correspond with one or more instances of the host servers 170.

The virtual network topology layer 506 is dynamic by nature, and as such, the VMs 514 can be moved among the blades 518 as needed. The physical network topology layer 508 is more static, and as such, no dynamic resource allocation is involved in this layer. Through such a network topology configuration, the association among application VNFs 510, the VM 514 supporting the application VNFs 510, and the blades 518 that hosts the VM 514 can be determined. In some embodiments, the operating system 174, the worker pool 150, the worker processing threads 154A-N, and/or the pool latency manager 130 can operate within the virtual network topology layer 506.

In the illustrated example, a first VNF is divided into two sub-VNFs, VNF 1-1 512A and VNF 1-2 512C, which is executed by VM 1-1-1 514A and VM 1-N-1 514C, respectively. The VM 1-1-1 514A is hosted by the blade 1-1 518A and managed by the hypervisor 1-1 516A in the server cluster 1 520A of the server host 522. Traffic switching between the blade 1-1 518A and the blade 1-N 518N is performed via ESwitch-1 524A. Traffic communications between the ESwitches 524 and the network(s) 102 can be performed via the routers 526. In this example, the VM 1-1-1 514A can be moved from the blade 1-1 518A to the blade 1-N 518N for VM live migration if the blade 1-1 518A is detected to have difficulty to support the VNF 1-1 512A performance requirements and the blade 1-N 518N has sufficient capacity and is available to support the VNF 1-1 512A performance requirements. The virtual network topology layer 506 is dynamic by nature due to real-time resource allocation/reallocation capability of a cloud software defined network ("SDN"). The association of application, VM, and blade host in this example is the VNF 1-1 512A is executed on the VM 1-1-1 514A hosted by the blade 1-1 518A in the server cluster 1 520A. In some embodiments, the worker processing threads 154A-N, the pool latency manager 130, and/or the load hash routine 152 can operate within or otherwise correspond with the APP layer 504.

Figure 6:
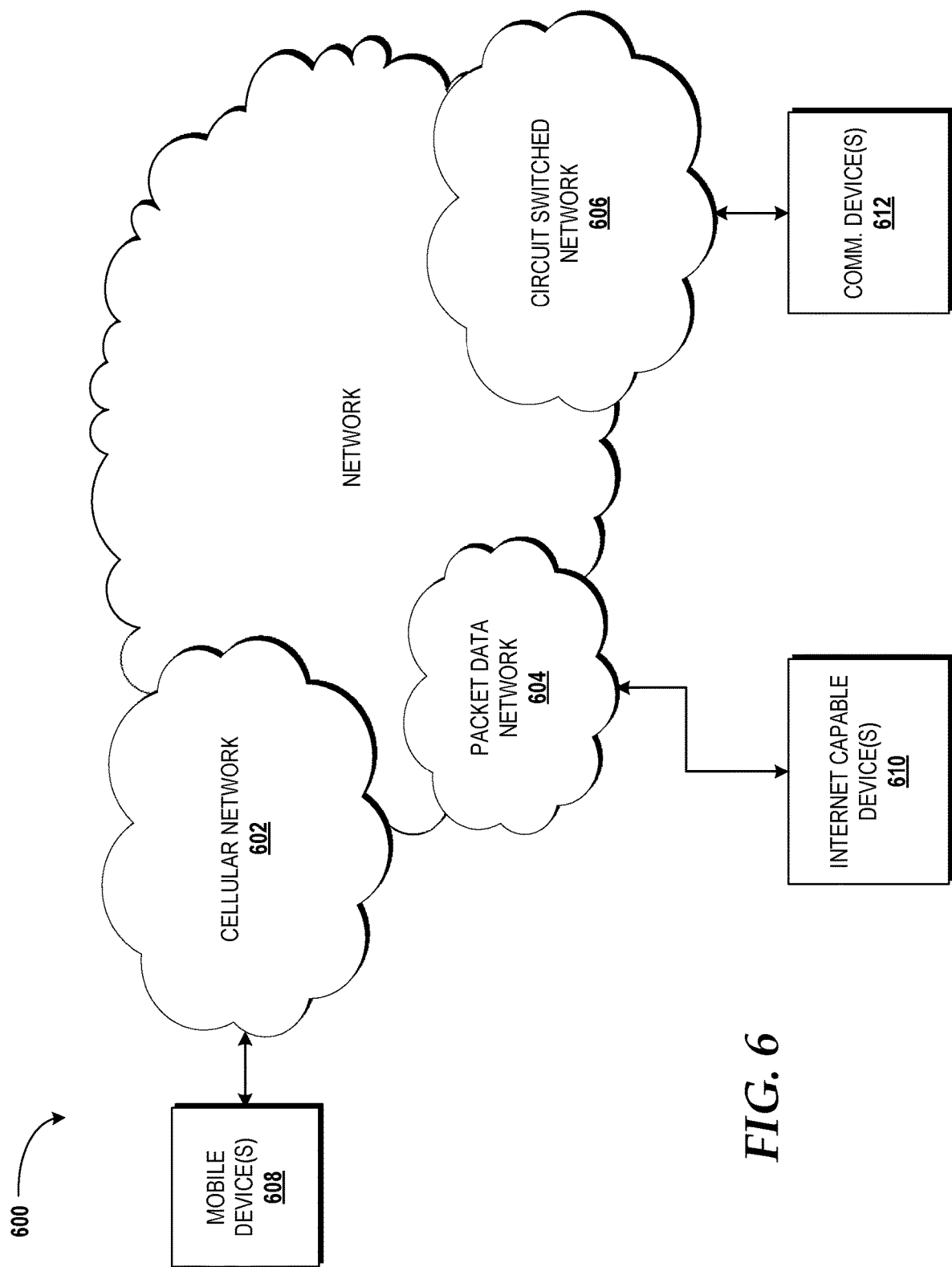
FIG. 6 is a diagram illustrating an example network capable of implementing aspects of the embodiments discussed herein.

Turning now to FIG. 6, details of a network 600 are illustrated, according to an illustrative embodiment. In some embodiments, one or more of the network 102 and/or the network 818 can be configured, at least in part, as the network 600. The network 600 includes a cellular network 602, a packet data network 604, for example, the Internet, and a circuit switched network 606, for example, a PSTN. The cellular network 602 includes various network components such as, but not limited to, base transceiver stations ("BTSs"), NBs, eNBs, gNBs, base station controllers ("BSCs"), radio network controllers ("RNCs"), mobile switching centers ("MSCs"), MMEs, short message service centers ("SMSCs"), multimedia messaging service centers ("MMSCs"), home location registers ("HLRs"), Home Subscriber Server ("HSSs"), Visitor Location Registers ("VLRs"), charging platforms, billing platforms, voicemail platforms, GPRS core network components, location service nodes, an IP Multimedia Subsystem ("IMS"), optical transport devices, and the like. The cellular network 602 also includes radios and nodes for receiving and transmitting voice, data, and combinations thereof to and from radio transceivers, networks, the packet data network 604, and the circuit switched network 606. In some embodiments, the network 102 of FIG. 1 can operate, at least in part, as the packet data network 604 and/or as or in cooperation with the cellular network 602.

The mobile communications device 608, such as, for example, a cellular telephone, a mobile terminal, a PDA, a laptop computer, a handheld computer, and combinations thereof, can be operatively connected to the cellular network 602. In some embodiments, the client device 104 can be configured as the mobile communications device 608. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G and 5G mobile communications standards such as LTE, or the like, as well as evolved and future mobile standards, including but not limited to LTE-Advanced, LTE-Advanced Pro and 5G.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (e.g., a "browser") for executing a web page in a format readable by the browser or other software such as executable applications. Other files and/or data may be accessible via "links" and/or pointers in the retrieved files, as is understood by one of skill in the technology. In some embodiments, the packet data network 604 includes or is in communication with the Internet. In some embodiments, the at least some of the network 102 can be configured as a packet data network, such as the packet data network 604. The circuit switched network 606 includes various hardware and software for providing circuit switched communications. The circuit switched network 606 may include, or may be, what is often referred to as a POTS. In some embodiments, the at least some of the network 102 also can be configured as a circuit switched network, such as the circuit switched network 606. The functionality of a circuit switched network 606 or other circuit-switched network are understood by one of skill in the technology and therefore will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. In some embodiments, the internet-capable devices 610 can include one or more client devices 10 and one or more network elements of the datacenter 110. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network of FIG. 6 is used to refer broadly to any combination of the networks 602, 604, 606 shown in FIG. 6. It should be appreciated that, in some embodiments, substantially all of the functionality described with reference to the network 102 and/or the datacenter 110 can be performed by the cellular network 602, the packet data network 604, and/or the circuit switched network 606, alone or in combination with other networks, network elements, and the like, according at least to aspects of the features and operations discussed herein.

Figure 7:
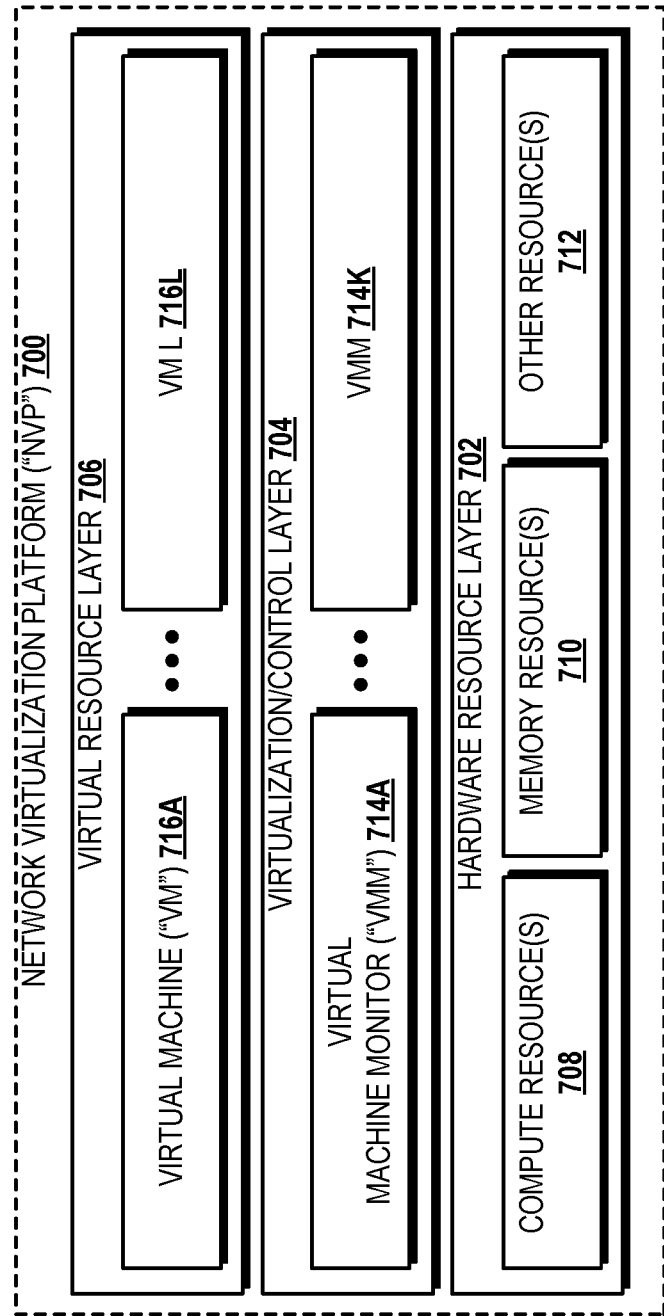
FIG. 7 is a block diagram illustrating a network virtualization platform ("NVP") capable of implementing aspects of the embodiments presented herein.

Turning now to FIG. 7, a block diagram illustrating an illustrative network virtualization platform ("NVP") 700 that can be used to implement, at least in part, the datacenter 110 and/or at least a portion thereof, introduced above in FIG. 1 will be described, according to an illustrative embodiment. For example, in some embodiments, the host servers 170, one or more processors 172, the memory 176, the operating system 174, any of the worker processing threads 154A-N, the SDN gateway 112, the distribution switch 114, and/or other network elements of the datacenter 110 can be implemented via the NVP 700. The illustrated NVP 700 includes a hardware resource layer 702, a virtualization/control layer 704, and a virtual resource layer 706 that work together to perform operations as will be described in detail herein. The hardware resource layer 702 provides hardware resources, which, in the illustrated embodiment, include one or more compute resources 708, one or more memory resources 710, and one or more other resources 712. In some embodiments, the hardware resource layer 702 can correspond with an embodiment of the host server 170 of the datacenter 110.

The compute resource(s) 708 can include one or more hardware components that perform computations to process data, and/or to execute computer-executable instructions of one or more application programs, operating systems, and/or other software, to provide, at least in part, any services or composition of services described herein. In some embodiments, the processor 108 can correspond with the compute resources 708. The compute resources 708 can include one or more central processing units ("CPUs") configured with one or more processing cores. The compute resources 708 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 708 can include one or more discrete GPUs. In some other embodiments, the compute resources 708 can include CPU and GPU components that are configured in accordance with a co-processing CPU/GPU computing model, wherein the sequential part of an application executes on the CPU and the computationally-intensive part is accelerated by the GPU. The compute resources 708 can include one or more system-on-chip ("SoC") components along with one or more other components, including, for example, one or more of the memory resources 710, and/or one or more of the other resources 712. In some embodiments, the memory 176 can correspond with the memory resources 710. In some embodiments, the compute resources 708 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 708 can be or can include one or more hardware components architected in accordance with an ARM architecture, available for license from ARM HOLDINGS of Cambridge, United Kingdom. Alternatively, the compute resources 708 can be or can include one or more hardware components architected in accordance with an x86 architecture, such an architecture available from INTEL CORPORATION of Mountain View, Calif., and others. Those skilled in the art will appreciate the implementation of the compute resources 708 can utilize various computation architectures or combinations thereof, and as such, the compute resources 708 should not be construed as being limited to any particular computation architecture or combination of computation architectures, including those explicitly disclosed herein.

The memory resource(s) 710 can include one or more hardware components that perform storage operations, including temporary or permanent storage operations. In some embodiments, the memory resource(s) 710 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), erasable programmable ROM ("EPROM"), electrically erasable programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 708.

The other resource(s) 712 can include any other hardware resources that can be utilized by the compute resource(s) 708 and/or the memory resource(s) 710 to perform operations described herein. The other resource(s) 712 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 702 can be virtualized by one or more virtual machine monitors ("VMMs") 714A-714K (also known as "hypervisors;" hereinafter, collectively "VMMs 714") operating within the virtualization/control layer 704 to manage one or more virtual resources that reside in the virtual resource layer 706. The VMMs 714 can be or can include software, firmware, and/or hardware that alone or in combination with other software, firmware, and/or hardware, manages one or more virtual resources operating within the virtual resource layer 706. In some embodiments, the host server 170 can provide the VMMs 714.

The virtual resources operating within the virtual resource layer 706 can include abstractions of at least a portion of the compute resources 708, the memory resources 710, the other resources 712, or any combination thereof. These abstractions are referred to herein as virtual machines ("VMs"). It should be understood, however, that other container technologies can be used and are contemplated. It is understood that as used herein, the term "abstractions" (and variants thereof) is to be interpreted within the realm of networking and computer engineered systems, specifically as a way to describe a layered computer implementation to transform physical, non-generic devices so as to veil an end user from viewing the complexity of network architecture that is executing at lower levels, thereby enabling the transformation of particular machines and implementation of concepts and technologies discussed herein. In no manner shall the term "abstractions" (or variants thereof), be used to interpret or construe the claims in such a way as being directed to an abstract idea or any other judicial exception. In the illustrated embodiment, the virtual resource layer 706 includes VMs 716A-716L (hereinafter, collectively "VMs 716"). The VMs 716 can execute instructions to provide, at least in part, any services or composition of services described herein, such as but not limited to, the load hash routing 152, the pool latency manager 130, and/or the network element controller 177. In some embodiments, at least one or more of the worker processing threads 154A-N can be configured to operate as one or more of the VMs 716 within the operating environment 100.

Figure 8:
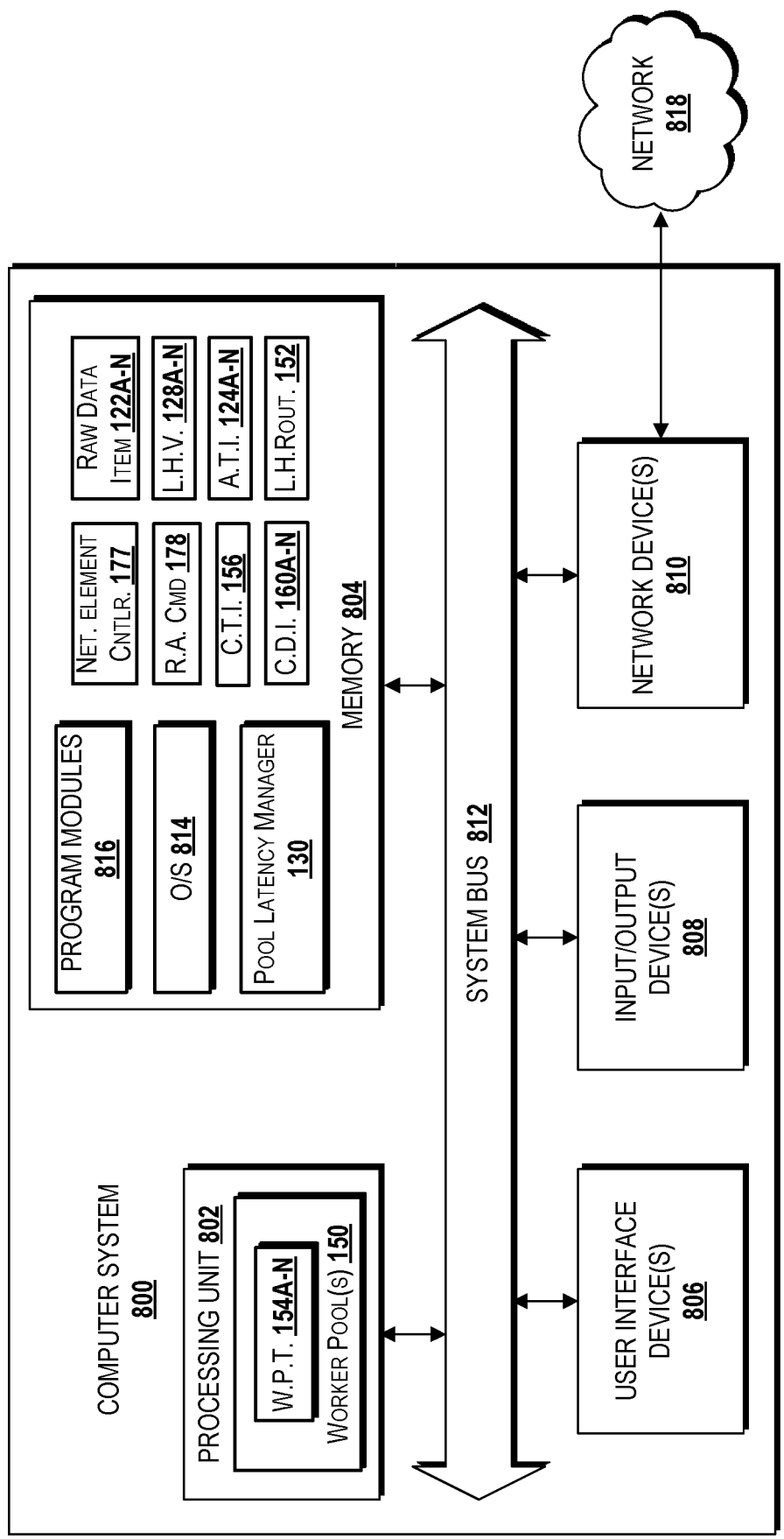
FIG. 8 is a block diagram illustrating an example computer system capable of implementing aspects of the embodiments presented and described herein.

Turning now to FIG. 8, a block diagram is provided illustrating a computer system 800 configured to provide the functionality in accordance with various embodiments of the concepts and technologies disclosed herein. The systems, devices, and other components disclosed herein can utilize, at least in part, an architecture that is the same as or at least similar to the architecture of the computer system 800. In some embodiments, one or more of the host servers 170 of the datacenter 110, the network access point 103, and/or the client devices 104, can be configured like the computer system 800. It should be understood, however, that modification to the architecture may be made to facilitate certain interactions among elements described herein.

The computer system 800 includes a processing unit 802, a memory 804, one or more user interface devices 806, one or more input/output ("I/O") devices 808, and one or more network devices 810, each of which is operatively connected to a system bus 812. The system bus 812 enables bi-directional communication between the processing unit 802, the memory 804, the user interface devices 806, the I/O devices 808, and the network devices 810.

The processing unit 802 may be a standard central processor that performs arithmetic and logical operations, a more specific purpose programmable logic controller ("PLC"), a programmable gate array, or other type of processor known to those skilled in the art and suitable for controlling the operation of the server computer. The processing unit 802 can include one or more central processing units ("CPUs") configured with one or more processing cores, and/or one or more graphics processing unit ("GPU") configured to accelerate operations performed by one or more CPUs. The processing unit 802 can include one or more system-on-chip ("SoC") components along with one or more other components, including, for example, one or more of the memory resources, and/or one or more of the other resources. Processing units are understood by one of ordinary skill in the technology, and therefore are not described in further detail herein. In some embodiments, one or more of the worker processing threads 154A-N can be provided by a processor, such as the processing unit 802. As such, one or more instances of the processing unit 802 can provide the worker pool 150. It is understood that the processors 172 of the datacenter 110 can be implemented as one or more instances of processing unit 802.

The memory 804 communicates with the processing unit 802 via the system bus 812. In various embodiments, the memory 176 of the host servers 170 within the datacenter 110 can be implemented as the memory 804. In some embodiments, the memory 804 is operatively connected to a memory controller (not shown) that enables communication with the processing unit 802 via the system bus 812. The illustrated memory 804 includes an operating system 814 and one or more program modules 816. The operating system 814 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 816 may include various software and/or program modules to perform the various operations described herein. In some embodiments, for example, the program modules 816 can include the pool latency manager 130, the load hash routine 152, the network element controller 177, and/or other program modules. These and/or other programs can be embodied in computer-readable medium including instructions that, when executed by the processing unit 802, in some embodiments, may perform and/or facilitate performance of one or more of the operations discussed with respect to FIGS. 1, 2, 3, 4A, and 4B described in detail above. According to some embodiments, the program modules 816 may be embodied in hardware, software, firmware, or any combination thereof. In some embodiments, the memory 804 also can be configured to store data including, but not limited to, the resource adjustment command 178, the completed time indicator 156, the completed data items 160A-N, the raw data item 122A-N, the load hash values 128A-N, the arrival time indicators 124A-N, the load hash set 129, the load hash range 132, the target latency ceiling 134, the current latency indicator 136, the adjusted processing rate 138, the current processing rate 146, the load hash subranges 144A-N, the raw data item types 142A-N, the adjusted worker size 140, the current worker size 148, and/or other data, if desired.

By way of example, and not limitation, computer-readable media may include any available computer storage media or communication media that can be accessed by the computer system 800. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid-state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 800. In the claims, the phrases "memory", "computer storage medium", and variations thereof, does not include waves or signals per se and/or communication media.

The user interface devices 806 may include one or more devices with which a user accesses the computer system 800. The user interface devices 806 may include, but are not limited to, computers, servers, PDAs, cellular phones, or any suitable computing devices. The I/O devices 808 enable a user to interface with the program modules 816. In one embodiment, the I/O devices 808 are operatively connected to an I/O controller (not shown) that enables communication with the processing unit 802 via the system bus 812. The I/O devices 808 may include one or more input devices, such as, but not limited to, a keyboard, a mouse, or an electronic stylus. Further, the I/O devices 808 may include one or more output devices, such as, but not limited to, a display screen or a printer. In some embodiments, the I/O devices 808 can be used for manual controls for operations to exercise under certain emergency situations.

The network devices 810 enable the computer system 800 to communicate with other networks or remote systems via a network 818, such as the network 102 and/or the network 600. Examples of the network devices 810 include, but are not limited to, a modem, a radio frequency ("RF") or infrared ("IR") transceiver, a telephonic interface, a bridge, a router, or a network card. The network devices 810 may support communication and functionality with the network 818, such as via physical network functions, virtual network functions, virtual and/or physical edge devices, or the like. The network devices 810 can, in some embodiments, be included in the datacenter 110, such as via the host server 170. The network 818 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, or additionally, the network 818 may be or may include a wired network such as, but not limited to, a Wide Area Network ("WAN"), a wired Personal Area Network ("PAN"), a wired Metropolitan Area Network ("MAN"), an optical network, a VoIP network, an IP/MPLS network, a PSTN network, an IMS network, an EPC network, or any other mobile network and/or wireline network.

Based on the foregoing, it should be appreciated that concepts and technologies directed to distributed load balancing for processing of high-volume data streams without a front-end load balancer have been disclosed herein. Although the subject matter presented herein has been described in language specific to computer structural features, methodological and transformative acts, specific computing machinery, and computer-readable mediums, it is to be understood that the concepts and technologies disclosed herein are not necessarily limited to the specific features, operations, or mediums described herein. Rather, the specific features, operations, and mediums are disclosed as example forms of implementing the concepts and technologies disclosed herein. The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
an incoming queue that receives and stores raw data items; and
a worker processing thread of a plurality of worker processing threads that form a worker pool, wherein the worker processing thread is assigned a corresponding load hash subrange and wherein the worker processing thread comprises
a processing resource, and
a memory resource that stores computer-executable instructions that, in response to execution by the processing resource, cause the processing resource to perform operations comprising:
accessing the raw data items in the incoming queue, wherein the incoming queue is in direct communication with each of the plurality of worker processing threads that form the worker pool,
generating a corresponding load hash value for each of the raw data items in the incoming queue, wherein generating the corresponding load hash value for each of the raw data items in the incoming queue comprises analyzing, via a load hash routine executing on the worker processing thread, information associated with each of the raw data items,
determining that at least one raw data item of the raw data items in the incoming queue is associated with a corresponding load hash value that falls outside of the corresponding load hash subrange of the worker processing thread, and
in response to determining that the corresponding load hash value of the at least one raw data item falls outside of the corresponding load hash subrange of the worker processing thread, ignoring the at least one raw data item.

2. The system of claim 1, further comprising a pool latency manager that performs operations comprising:
inspecting the incoming queue;
determining an incoming queue set size based on an amount of the raw data items that are present within the incoming queue; and
determining an amount of the worker processing threads that should operate in the worker pool so as to satisfy a target latency parameter for the worker pool.

3. The system of claim 2, wherein the pool latency manager performs further operations comprising reconfiguring the worker pool such that the target latency parameter is satisfied, wherein reconfiguring the worker pool includes one of:
spawning one or more additional worker processing threads to operate within the worker pool; or
terminating one or more of the worker processing threads from the plurality of the worker processing threads within the worker pool.

4. The system of claim 1, further comprising a pool latency manager that performs operations comprising:
generating a load hash range for the worker pool;
separating the load hash range into a plurality of load hash subranges; and
allotting one of the plurality of load hash subranges to each of the plurality of worker processing threads within the worker pool, wherein the allotting occurs without analysis of the raw data items within the incoming queue.

5. The system of claim 1, wherein the corresponding load hash value provides a signed integer value.

6. The system of claim 1, wherein the information associated with each of the raw data items is extracted from at least one field of each of the raw data items in the incoming queue.

7. The system of claim 6, wherein generating the corresponding load hash value for each of the raw data items in the incoming queue further comprises:
determining a corresponding multivariate string that represents each of the raw data items in the incoming queue based on the information extracted from the at least one field of each of the raw data items in the incoming queue; and
inputting the corresponding multivariate string that represents each of the raw data items in the incoming queue into the load hash routine executing on the worker processing thread to create a signed integer value that represents the corresponding load hash value for each of the raw data items in the incoming queue.

8. A method comprising:
accessing, by a worker processing thread of a plurality of worker processing threads that form a worker pool, raw data items in an incoming queue, wherein the incoming queue is in direct communication with each of the plurality of worker processing threads that form the worker pool, wherein the worker processing thread is assigned a corresponding load hash subrange;

generating, by the worker processing thread, a corresponding load hash value for each of the raw data items in the incoming queue, wherein generating the corresponding load hash value for each of the raw data items in the incoming queue comprises analyzing, via a load hash routine executing on the worker processing thread, information associated with each of the raw data items;

determining, by the worker processing thread, that at least one raw data item of the raw data items in the incoming queue is associated with a corresponding load hash value that falls outside of the corresponding load hash subrange of the worker processing thread; and in response to determining that the corresponding load hash value of the at least one raw data item falls outside of the corresponding load hash subrange of the worker processing thread, ignoring, by the worker processing thread, the at least one raw data item.

9. The method of claim 8, further comprising:

inspecting, by a pool latency manager, the incoming queue;

determining, by the pool latency manager, an incoming queue set size based on an amount of the raw data items that are present within the incoming queue; and determining, by the pool latency manager, an amount of the worker processing threads that should operate in the worker pool so as to satisfy a target latency parameter for the worker pool.

10. The method of claim 9, further comprising reconfiguring, by the pool latency manager, the worker pool such that the target latency parameter is satisfied, wherein reconfiguring the worker pool includes one of:

spawning one or more additional worker processing threads to operate within the worker pool; or terminating one or more of the worker processing threads from the plurality of the worker processing threads within the worker pool.

11. The method of claim 8, further comprising:

generating, by a pool latency manager, a load hash range for the worker pool;

separating, by the pool latency manager, the load hash range into a plurality of load hash subranges; and allotting, by the pool latency manager, one of the plurality of load hash subranges to each of the plurality of worker processing threads within the worker pool, wherein the allotting occurs without analysis of the raw data items within the incoming queue.

12. The method of claim 8, wherein the corresponding load hash value provides a signed integer value.

13. The method of claim 8, wherein the information associated with each of the raw data items is extracted from at least one field of each of the raw data items in the incoming queue.

14. The method of claim 13, wherein generating the corresponding load hash value for each of the raw data items in the incoming queue further comprises:

determining a corresponding multivariate string that represents each of the raw data items in the incoming queue based on the information extracted from the at least one field of each of the raw data items in the incoming queue; and inputting the corresponding multivariate string that represents each of the raw data items in the incoming queue into the load hash routine executing on the worker processing thread to create a signed integer value that represents the corresponding load hash value for each of the raw data items in the incoming queue.

15. A computer storage medium having computer-executable instructions stored thereon that, in response to execution by a processing resource of a worker processing thread of a plurality of worker processing threads, cause the processing resource of the worker processing thread to perform operations comprising:

accessing raw data items in an incoming queue, wherein the incoming queue is in direct communication with each of the plurality of worker processing threads, wherein the plurality of worker processing threads form a worker pool, and wherein the worker processing thread is assigned a corresponding load hash subrange;

generating a corresponding load hash value for each of the raw data items in the incoming queue, wherein generating the corresponding load hash value for each of the raw data items in the incoming queue comprises analyzing, via a load hash routine executing on the worker processing thread, information associated with each of the raw data items;

determining that at least one raw data item of the raw data items in the incoming queue is associated with a corresponding load hash value that falls outside of the corresponding load hash subrange of the worker processing thread; and in response to determining that the corresponding load hash value of the at least one raw data item falls outside of the corresponding load hash subrange of the worker processing thread, ignoring the at least one raw data item.

16. The computer storage medium of claim 15, wherein a pool latency manager performs operations comprising:

inspecting the incoming queue;

determining an incoming queue set size based on an amount of the raw data items that are present within the incoming queue; and determining an amount of worker processing threads that should operate in the worker pool so as to satisfy a target latency parameter for the worker pool.

17. The computer storage medium of claim 16, wherein the pool latency manager performs further operations comprising:

reconfiguring the worker pool such that the target latency parameter is satisfied, wherein reconfiguring the worker pool includes one of:

spawning one or more additional worker processing threads to operate within the worker pool; or terminating one or more of the worker processing threads from the plurality of the worker processing threads within the worker pool.

18. The computer storage medium of claim 15, wherein a pool latency manager performs operations comprising:

generating a load hash range for the worker pool;

separating the load hash range into a plurality of load hash subranges; and allotting one of the plurality of load hash subranges to each of the plurality of worker processing threads within the worker pool, wherein the allotting occurs without analysis of the raw data items within the incoming queue.

19. The computer storage medium of claim 15, wherein the information associated with each of the raw data items is extracted from at least one field of each of the raw data items in the incoming queue.

20. The computer storage medium of claim 19, wherein generating the corresponding load hash value for each of the raw data items in the incoming queue further comprises:
- determining a corresponding multivariate string that represents each of the raw data items in the incoming queue based on the information extracted from the at least one field of each of the raw data items in the incoming queue; and
- inputting the corresponding multivariate string that represents each of the raw data items in the incoming queue into the load hash routine executing on the worker processing thread to create a signed integer value that represents the corresponding load hash value for each of the raw data items in the incoming queue.

* * * * *